(12) United States Patent
Tashiro et al.

(10) Patent No.: US 10,379,902 B2
(45) Date of Patent: Aug. 13, 2019

(54) INFORMATION PROCESSING DEVICE FOR AGGREGATING LOAD INFORMATION, INFORMATION PROCESSING SYSTEM FOR AGGREGATING LOAD INFORMATION, AND NON-TRANSITORY COMPUTER-READABLE STORAGE MEDIUM RECORDING PROGRAM FOR AGGREGATING LOAD INFORMATION

(71) Applicant: FUJITSU LIMITED, Kawasaki-shi, Kanagawa (JP)

(72) Inventors: Atsushi Tashiro, Nagoya (JP); Shinichi Kameyama, Iwakura (JP); Tomoshi Takagawa, Nagoya (JP); Fumihiko Kono, Nagoya (JP); Minoru Maeda, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 1 day.

(21) Appl. No.: 15/807,731

(22) Filed: Nov. 9, 2017

(65) Prior Publication Data
US 2018/0136973 A1     May 17, 2018

(30) Foreign Application Priority Data

Nov. 14, 2016   (JP) .................................. 2016-221968

(51) Int. Cl.
*G06F 9/48*     (2006.01)

(52) U.S. Cl.
CPC .................................. *G06F 9/4881* (2013.01)

(58) Field of Classification Search
CPC .................................................. G06F 9/4881
See application file for complete search history.

(56) References Cited

U.S. PATENT DOCUMENTS

| 2011/0099403 | A1  | 4/2011 | Miyata et al. |
| 2014/0047454 | A1* | 2/2014 | Oliver ................... G06F 9/5083 718/104 |

(Continued)

FOREIGN PATENT DOCUMENTS

| JP | 09-269925    | 10/1997 |
| JP | 2011-090594  | 5/2011  |
| JP | 2015-210576  | 11/2015 |

*Primary Examiner* — Charlie Sun
(74) *Attorney, Agent, or Firm* — Xsensus LLP

(57) ABSTRACT

An information processing device included in a plurality of information processing devices of an information processing system, the information processing device including configured to acquire pieces of load information indicating loads on the plurality of information processing devices from each of the plurality of information processing devices, perform a first aggregation processing that aggregates the acquired pieces of load information, determine whether the first aggregation processing is to be distributed based on the acquired pieces of load information, when the information processing device determines that the first aggregation processing is to be distributed, transmit, to at least two information processing devices included in plurality of information processing devices, an execution request of second aggregation processing, the second aggregation processing being aggregation processing for each of a plurality of device groups obtained by dividing the plurality of information processing devices by the number of the at least two information processing devices.

7 Claims, 18 Drawing Sheets

(56) References Cited

U.S. PATENT DOCUMENTS

| | | | |
|---|---|---|---|
| 2015/0169370 A1* | 6/2015 | Howson | G06F 15/8007 718/106 |
| 2015/0236974 A1* | 8/2015 | Minamitake | H04L 47/726 709/226 |
| 2015/0309841 A1 | 10/2015 | Ono | |

\* cited by examiner

INFORMATION PROCESSING DEVICE FOR AGGREGATING LOAD INFORMATION, INFORMATION PROCESSING SYSTEM FOR AGGREGATING LOAD INFORMATION, AND NON-TRANSITORY COMPUTER-READABLE STORAGE MEDIUM RECORDING PROGRAM FOR AGGREGATING LOAD INFORMATION

CROSS-REFERENCE TO RELATED APPLICATION

This application is based upon and claims the benefit of priority of the prior Japanese Patent Application No. 2016-221968, filed on Nov. 14, 2016, the entire contents of which are incorporated herein by reference.

FIELD

The embodiments discussed herein are related to an information processing device, an information processing system, and a non-transitory computer-readable storage medium.

BACKGROUND

In the past, one system has been constructed from information processing devices in some cases. In addition, pieces of state information of the information processing devices are collected and aggregated, thereby being stored in a storage area of one of the information processing devices, in some cases. As a technique of the related art, there is, for example, a technique that acquires information of operating states of center servers by using distributed servers and that quickly makes a reply, in a case where one of the center servers is in a state of an excessive load for processing requests of respective numerous personal computers (PCs) serving as clients, to each of the PCs to that effect. In addition, there is a technique in which a server management device manages a physical server group to operate a virtual server group and in which, at a time of operating a cluster system including virtual servers arranged in the physical server group, arrangement states of the virtual servers are managed based on a load state of the virtual server group. In addition, there is a technique in which an control device to control information processing devices collects loads on the respective information processing devices and in which, in a case where a frequency at which one of the loads exceeds a first threshold value exceeds a first ratio, the control device terminates a virtual machine that operates on an information processing unit exceeding the first ratio.

Examples of the related techniques are disclosed in Japanese Laid-open Patent Publication No. 9-269925, Japanese Laid-open Patent Publication No. 2011-90594, and Japanese Laid-open Patent Publication No. 2015-210576.

SUMMARY

According to an aspect of the invention, an information processing device included in a plurality of information processing devices of an information processing system, the information processing device including a memory, and a processor coupled to the memory and the processor configured to acquire pieces of load information indicating loads on the plurality of information processing devices from each of the plurality of information processing devices, perform a first aggregation processing that aggregates the acquired pieces of load information, determine whether the first aggregation processing is to be distributed or not based on the acquired pieces of load information, when the information processing device determines that the first aggregation processing is to be distributed, transmit, to at least two information processing devices included in plurality of information processing devices, an execution request of second aggregation processing, the second aggregation processing being aggregation processing for each of a plurality of device groups obtained by dividing the plurality of information processing devices by the number of the at least two information processing devices, and receive a result of the second aggregation processing from the at least two information processing devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

However, according to the related art, a load applied on determination of load distribution of aggregation processing for aggregating pieces of state information of respective information processing devices increases with an increase in the number of the information processing devices. Specifically, as an indicator for performing the load distribution, loads on the respective information processing devices turn out to be referenced. However, since information indicating loads on the respective information processing devices is stored in a storage area of a certain information processing device, a load applied on the relevant information processing device increases.

As one aspect, an object of the present technology is to provide an information processing device, an information processing system, and a state information collection program that are each able to suppress a load applied on determination of load distribution of aggregation processing for aggregating pieces of state information of respective information processing devices.

Hereinafter, disclosed embodiments of an information processing device, an information processing system, and a state information collection program will be described in detail with reference to drawings.

Figure 1:
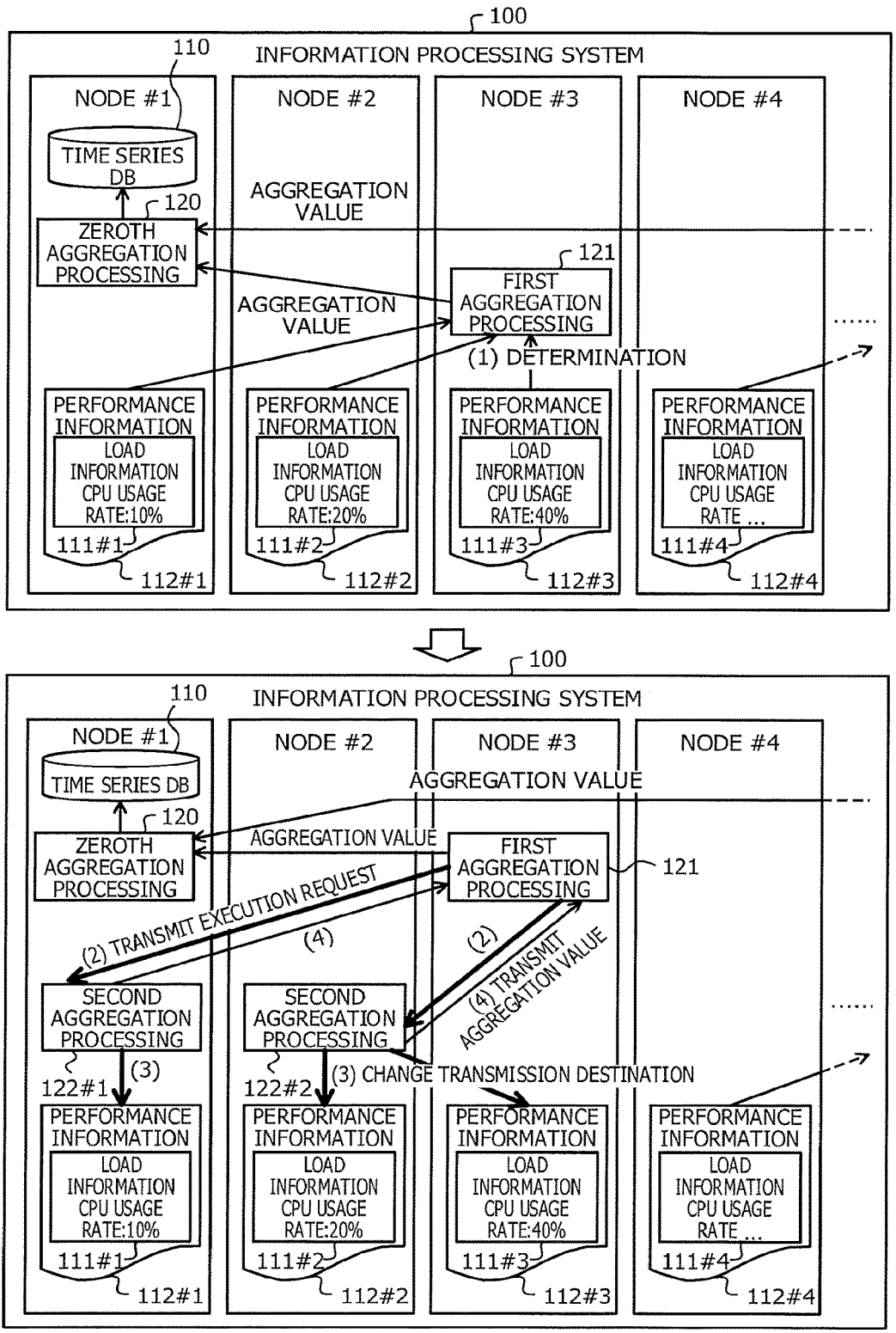
FIG. 1 is an explanatory diagram illustrating an example of an operation of an information processing system according to the present embodiments.

FIG. 1 is an explanatory diagram illustrating an example of an operation of an information processing system 100 according to the present embodiments. The information processing system 100 is a system constructed by information processing devices by using a technology called a software defined storage (SDS). Each of the information processing devices is a computer such as, for example, a server or a storage device. Hereinafter, each of the information processing devices is called a "node". Nodes are located within a certain data center (DC), for example. In addition, a distributed architecture in which nodes are regarded as one storage device may be applied to the information processing system 100. In addition, it is possible to improve the performance of the information processing system 100 by using scale-out.

The distributed architecture may have a performance monitoring function utilizing a time series database (DB) to store therein pieces of state information of the respective nodes. The performance monitoring function performs collecting, storing, and referencing the pieces of state information of the respective nodes, for example. In addition, one of the nodes includes the time series D. The node including the time series DB is called a "representative node". While the representative node is basically unchanged during an operation of the information processing system 100, sometimes another node becomes a representative node in a case where the former representative node fails to operate properly, for example.

The state information of each of the nodes includes performance information of the relevant node, configuration information of the relevant node, and processing information of the relevant node. The performance information of each of the nodes is a central processing unit (CPU) usage rate, a network usage rate, input/output per second (IOPS), or a disk usage rate, for example. The configuration information of each of the nodes is information indicating a configuration of physical resources of the relevant node and a configuration of a virtual machine that operates on the relevant node. The processing information of each of the nodes is information indicating a state of progress of copy processing or the like of the relevant node, for example. The state information of each of the nodes may be obtained by using a "stat" call prepared by an OS or file reference, for example. Hereinafter, for the sake of simplicity of a description, the description will be provided under the assumption that the state information of each of the nodes is the performance information of the relevant node.

Here, in an actual system, the performance information stored in the time series DB every one unit time has several thousands to hundreds of thousands of units in combination with physical resources and virtual resources. At this time, aggregation values such as a sum total and an average of pieces of performance information at every time, for example, pieces of information of a total IOPS and an average IOPS of all disks take a processing load and time in a case of being calculated every reference, and a frequency at which the aggregation values are referenced is relatively high.

Regarding, for example, the aggregation values, there is conceivable a method in which the representative node stores, in the time series DB, the pieces of performance information of the respective nodes after aggregating the pieces of performance information thereof. However, in the relevant method, all pieces of performance information serving as aggregation targets are brought together in the representative node, and the representative node executes aggregation processing for calculating the aggregation values. Therefore, there is a possibility that a CPU of the representative node or a network becomes a bottleneck, thereby influencing a normal business operation such as disk write.

Therefore, it is conceivable that aggregation processing for calculating the aggregation values is distributed, thereby distributing loads to nodes. However, in the relevant method, a load applied on determination of load distribution increases with an increase in the number of nodes. Specifically, as an indicator for dynamically performing the load distribution, CPU loads on the respective nodes and network loads thereon turn out to be referenced. However, pieces of information such as the CPU loads on the respective nodes and the network loads thereon are held by the time series DB. Accordingly, a load on the representative node including the time series DB and a load on a network between nodes serving as load distribution destinations and the representative node turn out to increase. In addition, since the representative node determines nodes to which loads are to be distributed, a load on the representative node turns out to increase.

Therefore, in the present embodiments, determination of load distribution of aggregation processing, based on a load on a self-node and transmitted loads on respective nodes will be described.

By using FIG. 1, an example of an operation of the information processing system 100 will be described. In the information processing system 100 illustrated in FIG. 1, nodes are constructed as nodes #1, #2, #3, #4, . . . . Here, in the following description, a symbol to which "#x" is assigned indicates being related to a node #x. "x" is a natural number. In addition, in FIG. 1, thick arrows each indicate an instruction to another node, and usual arrows each indicate transmission of data.

As illustrated in FIG. 1, since the node #1 includes a time series DB 110, the node #1 serve as a representative node. In addition, the information processing system 100 aggregates pieces of performance information 112 including pieces of load information 111 indicating loads on nodes, acquired by the respective nodes. Each of the pieces of load information 111 is a CPU usage rate or a network usage rate, for example. In the example of FIG. 1, it is assumed that each of the pieces of load information 111 is the CPU usage rate.

In an upper portion of FIG. 1, the aggregation processing is distributed to zeroth aggregation processing 120 and first aggregation processing 121. In addition, the node #1 serving as the representative node executes the zeroth aggregation processing 120, and the node #3 executes the first aggregation processing 121. While being omitted in FIG. 1, one of nodes subsequent to the node #4 executes the first aggregation processing 121.

The first aggregation processing collects, as aggregation targets, pieces of performance information 112#1 to 112#3 of the nodes #1 to #3 and transmits aggregated aggregation values to the node #1 to execute the zeroth aggregation processing 120. The zeroth aggregation processing 120 further aggregates the aggregation values transmitted by the first aggregation processing 121 and stores, in the time series DB 110, obtained aggregation values. FIG. 1 illustrates an example in which the first aggregation processing 121 of the node #3 is distributed.

As illustrated by (1) in FIG. 1, based on a load on the node #3 itself and loads indicated by pieces of load information 111#1 to 111#3 included in the pieces of performance information 112#1 to 112#3 of the nodes #1 to #3 serving as aggregation targets of the node #3, the node #3 determines whether or not to distribute the first aggregation processing 121. Here, the pieces of load information 111#1 to 111#3 are pieces of information aggregated by the node #3. Therefore, the node #3 does not have to reference the time series DB 110 for determination of load distribution.

In a case where the load on the node #3 itself is greater than a total value of the average of the loads on the nodes #1 to #3 serving as aggregation targets and a load determination value serving as a predetermined value, for example, the node #3 determines that the first aggregation processing 121 is to be distributed. In the example of FIG. 1, the piece of load information 111#1 indicates that the CPU usage rate of the node #1 is 10 [%]. In addition, the piece of load information 111#2 indicates that the CPU usage rate of the node #2 is 20 [%]. In addition, the piece of load information 111#3 indicates that the CPU usage rate of the node #3 is 40 [%]. In addition, it is assumed that the load determination value is 10 [%]. In this case, the load on the node #3 itself of 40 [%]>(10 [%]+20 [%]+40 [%])/3+10 [%]=33.3 [%] is satisfied. Therefore, the node #3 determines that the first aggregation processing 121 is to be distributed.

In a case where it is determined that the first aggregation processing 121 is to be distributed, the node #3 transmits an execution request for second aggregation processing 122, to each of two or more nodes that are included in a node group serving as an aggregation target and that are different from the node #3, as illustrated by (2) in FIG. 1. Here, the second aggregation processing 122 is processing for aggregating pieces of performance information 112 of nodes belonging to one of groups obtained by dividing, by the number of the two or more nodes concerned, the node group serving as an aggregation target. In addition, the number of nodes to which execution requests for the second aggregation processing 122 are transmitted only has to be greater than or equal to two. However, if a load increases, distribution only has to be further performed. Therefore, it is desirable that the number of nodes is two. In addition, as for a method for determining nodes that are included in the node group serving as an aggregation target and to which the execution requests for the second aggregation processing 122 are to be transmitted, the nodes may be set to a node having the lowest load and a node having the second lowest load, for example. In addition, a method for dividing the node group serving as an aggregation target may adopt any type of division. However, in order to evenly distribute loads, it is desirable to divide the node group serving as an aggregation target as evenly as possible.

As illustrated in, for example, a lower portion in FIG. 1, the node #3 transmits execution requests for the second aggregation processing 122#1 and the second aggregation processing 122#2, to the nodes #1 and #2, respectively. Here, the second aggregation processing 122#1 is processing for aggregating the performance information 112#1 of the node #1. In addition, the second aggregation processing 122#2 is processing for aggregating the pieces of performance information 112#2 and 112#3 of the respective nodes #2 and #3.

In addition, as illustrated by (3) in FIG. 1, the node #3 transmits, to each of nodes belonging to a corresponding one of groups, an instruction to change a transmission destination of the performance information 112 of the relevant node to a node to execute the second aggregation processing 122 for the corresponding one of groups. As illustrated by, for example, the lower portion of FIG. 1, the node #3 instructs the node #1 to transmit the performance information 112#1 to the node #1 and instructs the nodes #2 and #3 to transmit the performance information 112#2 to the node #2. In addition, the node #3 may instruct each of the nodes #1 and #2 to which the execution requests for the second aggregation processing 122 are transmitted, to change transmission destinations of the pieces of performance information 112 for nodes belonging to a corresponding one of the groups.

In addition, as illustrated by (4) in FIG. 1, the node #3 transmits, to a node to which the execution request for the second aggregation processing 122 is transmitted, an instruction to transmit, to the node #3, a processing result of the second aggregation processing 122 executed by the relevant node. As illustrated by, for example, the lower portion of FIG. 1, the node #3 instructs the node #1 to transmit, to the node #3, a processing result of the second aggregation processing 122#1 and instructs the node #2 to transmit, to the node #3, a processing result of the second aggregation processing 122#2.

In addition, the node #3 further aggregates, as the first aggregation processing 121, aggregation values serving as processing results of the second aggregation processing 122#1 and the second aggregation processing 122#2 and transmits, to the node #1, aggregation values serving as processing results of the first aggregation processing 121.

For this reason, the first aggregation processing 121 illustrated by the upper portion of FIG. 1 is distributed to the first aggregation processing 121, the second aggregation processing 121#1, and the second aggregation processing 121#2, illustrated by the lower portion of FIG. 1. Therefore, it is possible to distribute a load applied on the node #3. Furthermore, at a time of determining load distribution, the node #3 does not reference the time series DB 110. Therefore, it is possible to suppress a load applied on determination of load distribution.

In addition, while, in the description of FIG. 1, nodes are described so as to be located within the certain DC, there is no limitation to this. Some nodes out of the nodes may be located in the certain DC, and the remaining nodes may be located in a DC in a remote location located away from one of the nodes. In addition, in this case, at a time of dividing the node group serving as an aggregation target, a node to perform the division may divide the node group serving as an aggregation target into a first group to which nodes included in the certain DC belong and a second group to which nodes included in the DC in the remote location belong. In addition, the node to perform the division may transmit the processing requests for the second aggregation processing 122 to a node having the lowest load in the first group and a node having the lowest load in the second group. Next, an example of using the information processing system 100 will be described by using FIG. 2.

Figure 2:
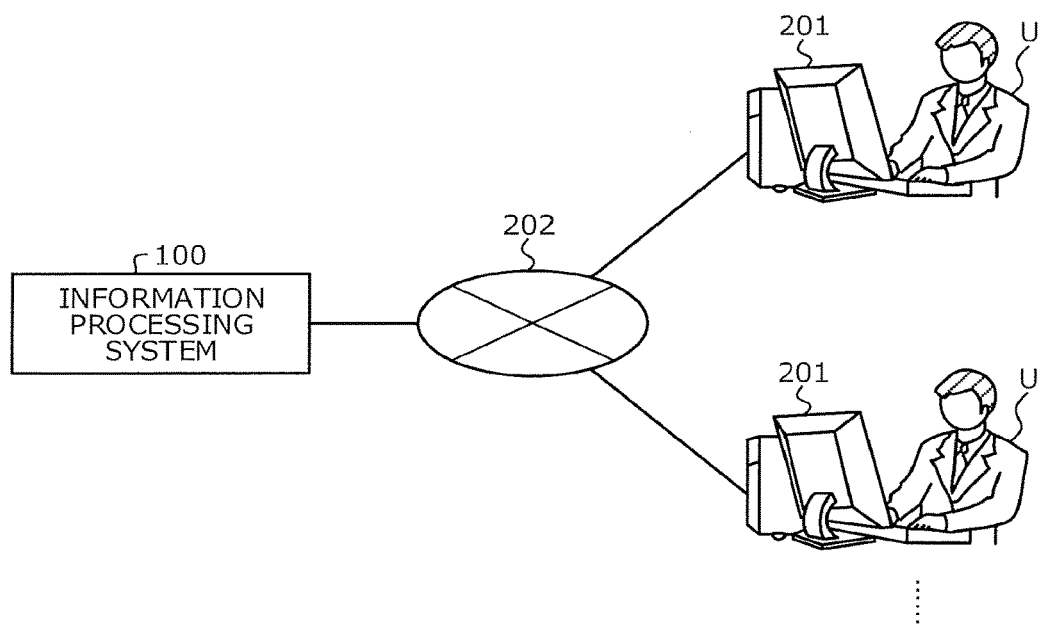
FIG. 2 is an explanatory diagram illustrating an example of using the information processing system.

FIG. 2 is an explanatory diagram illustrating an example of using the information processing system 100. As illustrated in FIG. 2, the information processing system 100 is coupled to user terminals 201 and a network 202 such as the Internet, a local area network (LAN), or a wide area network (WAN).

The user terminals 201 are computers operated by respective users U who use the information processing system 100. Each of the user terminal 201 is a PC, for example. The nodes located within, for example, the information processing system 100 operate a business system, and the users U each operate a corresponding one of the user terminals 201 and each access the information processing system 100, thereby using the business system and performing a business operation.

Next, an example of a hardware configuration of the node #1 included in the information processing system 100 will be described by using FIG. 3. Note that since hardware of each of nodes other than the node #1 has the same hardware as that of the node #1, a description thereof will be omitted.

Figure 3:
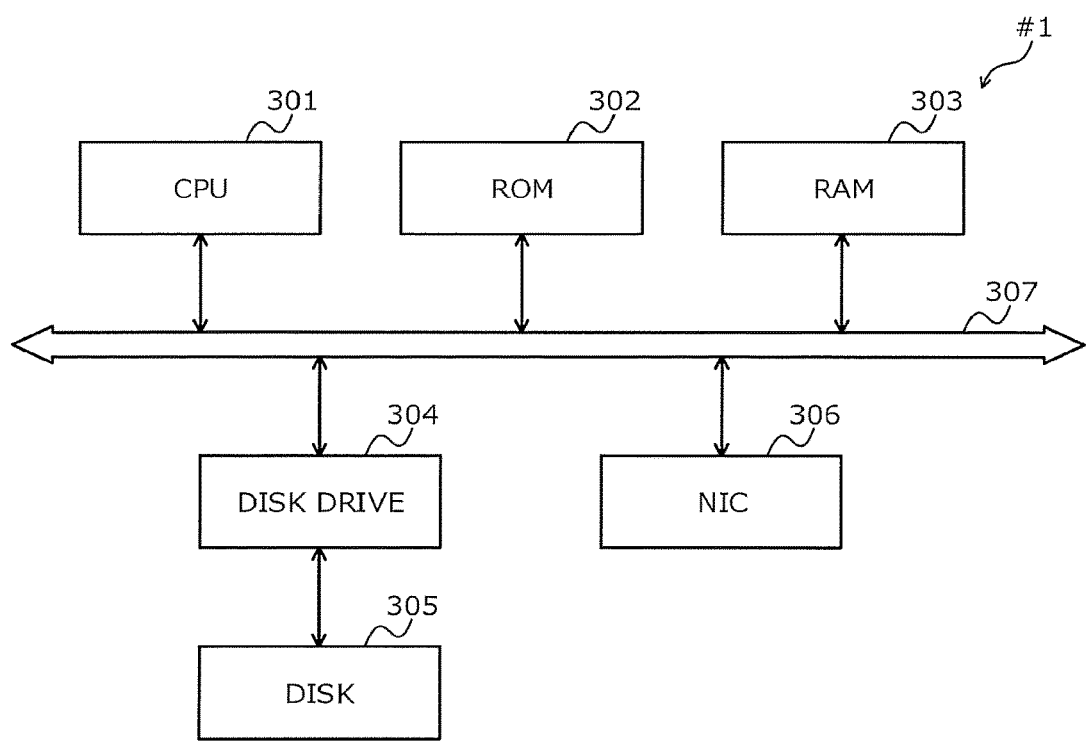
FIG. 3 is an explanatory diagram illustrating an example of a hardware configuration of a first node.

FIG. 3 is an explanatory diagram illustrating an example of a hardware configuration of the node #1. In FIG. 3, the node #1 includes a CPU 301, a read-only memory (ROM) 302, and a random access memory (RAM) 303. In addition, the node #1 includes a disk drive 304, a disk 305, and a network interface card (NIC) 306. In addition, the CPU 301 to the disk drive 304 and the NIC 306 are coupled to one another by a bus 307.

The CPU 301 is an arithmetic processing device to manage control of the entire node #1. The ROM 302 is a nonvolatile memory storing therein a program such as a boot program. The RAM 303 is a volatile memory used as a work area of the CPU 301.

The disk drive 304 is a control device to control reading and writing of data from and to the disk 305 in accordance with control from the CPU 301. As the disk drive 304, a magnetic disk drive, an optical disk drive, a solid state drive, or the like may be adopted, for example. The disk 305 is a nonvolatile memory to store therein data written by control from the disk drive 304. In a case where the disk drive 304 is, for example, a magnetic disk drive, a magnetic disk may be adopted as the disk 305. In addition, in a case where the disk drive 304 is an optical disk drive, an optical disk may be adopted as the disk 305. In addition, in a case where the disk drive 304 is a solid state drive, a semiconductor memory formed by semiconductor elements, in other words, a so-called semiconductor disk may be adopted as the disk 305.

The NIC 306 is a control device that manages an interface between the inside and the network 202 and that controls inputting and outputting of data from and to another device. Specifically, the NIC 306 is coupled to another device through a communication line via the network 202. As the NIC 306, a LAN adapter or the like may be adopted, for example.

In addition, in a case where an administrator of the information processing system 100 directly operates the node #1, the node #1 may include pieces of hardware such as a display, a keyboard, and a mouse.

Example of Functional Configuration of Information Processing System 100

Figure 4:
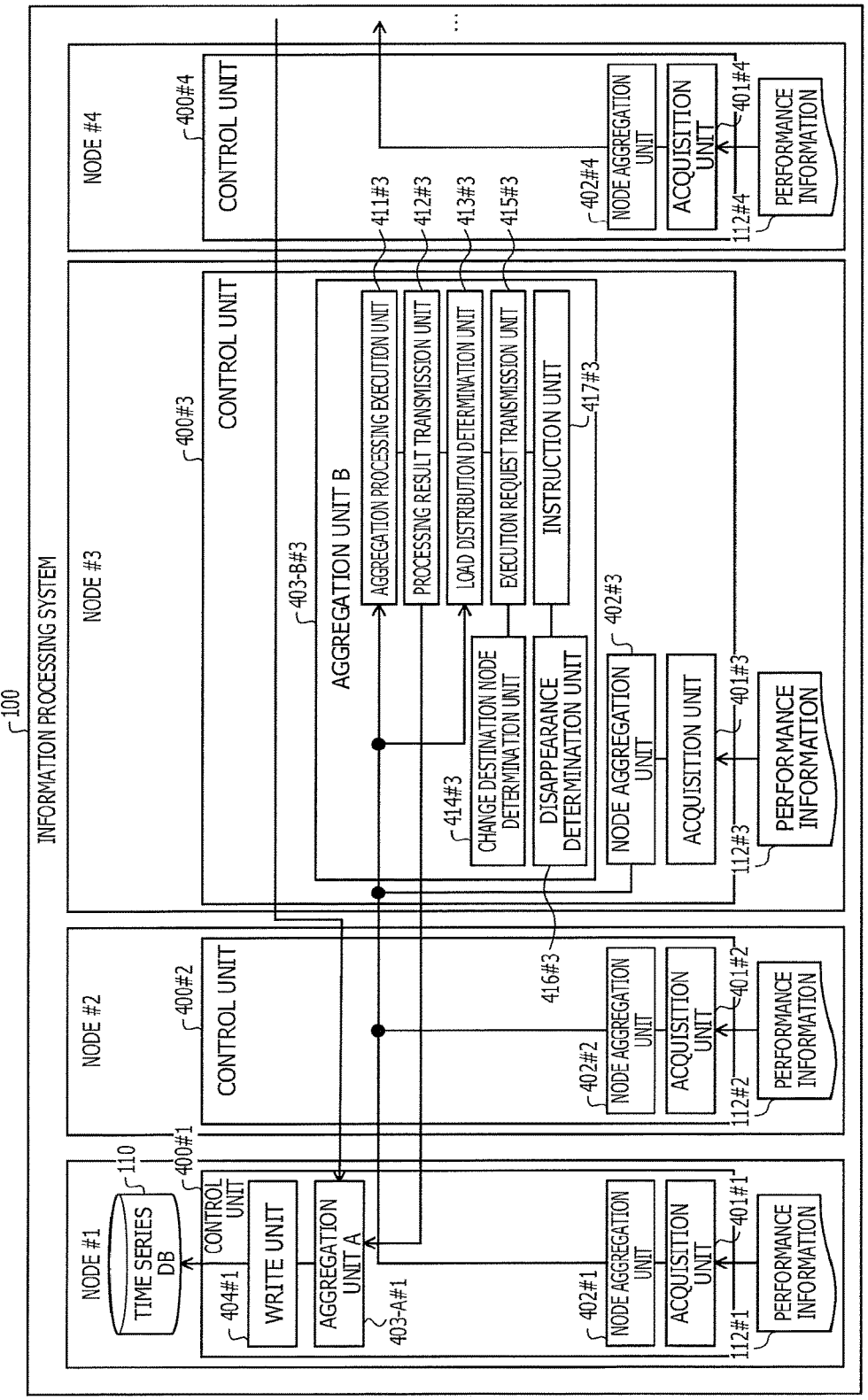
FIG. 4 is an explanatory diagram illustrating an example of a functional configuration of the information processing system.

FIG. 4 is an explanatory diagram illustrating an example of a functional configuration of the information processing system 100. The nodes each include a control unit 400. The control unit 400 includes an acquisition unit 401, a node aggregation unit 402, an aggregation unit 403, and a write unit 404. The CPU 301 executes a program stored in a storage device, thereby causing the control unit 400 to realize functions of respective units. Specifically, examples of the storage device include the ROM 302, the RAM 303, and the disk 305 illustrated in FIG. 3, for example. In addition, processing results of the respective units are stored in the RAM 303, registers of the CPU 301, a cache memory of the CPU 301, and so forth.

At regular time intervals, the acquisition unit 401 acquires the performance information 112 such as a CPU usage rate, IOPS, or a disk usage rate, by using a "stat" system call or file reference.

In each of the nodes, the node aggregation unit 402 calculates the performance information 112 at every time. In addition, the node aggregation unit 402 transmits the performance information 112 to the aggregation unit 403.

The aggregation unit 403 aggregates the pieces of performance information 112 of the respective nodes. Here, in the present embodiments, in monitoring of performance of a distributed architecture, the aggregation unit 403 is dynamically arranged in a distributed manner, thereby distributing a load. At this time, by using, as a determination criterion, the performance information 112 such as a CPU or network used in a process of aggregation, the aggregation unit 403 dynamically determines an arrangement node of the aggregation unit 403 and a depth of a distribution hierarchy. For this reason, the aggregation unit 403 avoids concentration of loads and keeps, at a minimum, an influence on the normal business operations of the users U.

In addition, as the types of the aggregation unit 403, a parent aggregation unit and a child aggregation unit are defined. The parent aggregation unit indicates the aggregation unit 403 that already exists. The child aggregation unit indicates the aggregation unit 403 newly generated by a parent. In addition, a "node responsible for aggregation" is defined. The node responsible for aggregation is defined as a node to serve as a target of aggregation of the performance information 112 by the aggregation unit 403, in other words, a node to transmit the performance information 112 to the aggregation unit 403. Note that, in a case where the aggregation unit 403 does not perform load distribution, in other words, in a case where the aggregation unit 403 only exists in the representative node within the information processing system 100, it is assumed that the type of the relevant aggregation unit 403 is the child aggregation unit.

In addition, in the following description, in order to easily understand a parent-child relationship, it is assumed that the aggregation unit 403 that exists first is the aggregation unit 403-A. In addition, it is assumed that the aggregation unit 403 newly generated by the aggregation unit 403-A is the aggregation unit 403-B and the aggregation unit 403 newly generated by the aggregation unit 403-B is the aggregation unit 403-C. In addition, in drawings subsequent to FIG. 4, in order to more easily understand the parent-child relationship, a character string within the aggregation unit 403-A is displayed as an "aggregation unit A", a character string within the aggregation unit 403-B is displayed as an "aggregation unit B", and a character string within the aggregation unit 403-C is displayed as an "aggregation unit C". Furthermore, in order to easily understand a node in which the aggregation unit 403 is arranged, a symbol of the node is assigned to the aggregation unit 403 in some cases. An aggregation unit 403-B#3 is the aggregation unit 403 newly generated by the aggregation unit 403-A and indicates the aggregation unit 403 arranged in the node #3, for example.

In addition, the aggregation unit 403 includes an aggregation processing execution unit 411, a processing result transmission unit 412, a load distribution determination unit 413, a change destination node determination unit 414, an execution request transmission unit 415, a disappearance determination unit 416, and an instruction unit 417. While, here, FIG. 4 illustrates that the aggregation unit 403-B#3 includes the aggregation processing execution unit 411 to the instruction unit 417, the aggregation unit 403-A#1 includes the aggregation processing execution unit 411 to the instruction unit 417. In addition, the aggregation unit 403 is likely to be generated in any one of the nodes.

The aggregation processing execution unit 411 aggregates the pieces of performance information 112 and aggregation values of the pieces of performance information 112, transmitted by the node aggregation units 402 in nodes responsible for aggregation. The aggregation processing execution unit 411 calculates a total value and an average value as aggregation values of the pieces of performance information 112, for example. The aggregation processing execution unit 411 in the aggregation unit 403-A#1 is equivalent to the zeroth aggregation processing 120 illustrated in FIG. 1. In addition, the aggregation processing execution unit 411#3 is equivalent to the first aggregation processing 121 illustrated in FIG. 1.

The processing result transmission unit 412 transmits a processing result of the aggregation processing execution unit 411 to the aggregation unit 403 serving as a parent aggregation unit of the processing result transmission unit 412 itself. In addition, in order to fill individual fields of the time series DB 110, the processing result transmission unit 412 transmits values of the pieces of performance information 112 themselves from the nodes responsible for aggregation, to the aggregation unit 403 serving as a parent aggregation unit of the processing result transmission unit 412 itself. In addition, the processing result transmission unit 412 located in the representative node sends, to the write unit 404, a processing result of the aggregation processing execution unit 411.

Based on a load on the self-node and loads indicated by the pieces of load information 111 included in the pieces of performance information 112 of respective nodes of a node-responsible-for-aggregation group, aggregated by the self-node, the load distribution determination unit 413 determines whether or not to distribute aggregation processing for aggregating the pieces of performance information 112 of the respective nodes. Here, the relevant aggregation processing is the first aggregation processing 121 illustrated in FIG. 1 in a case of the load distribution determination unit 413#3 and is the zeroth aggregation processing 120 illustrated in FIG. 1 in a case of the load distribution determination unit 413#1. In a case where a value obtained by subtracting, from a load on the node #3 serving as the self-node, an average value of loads on the node-responsible-for-aggregation group is greater than the load determination value, for example, the load distribution determination unit 413#3 determines that the first aggregation processing 121 based on the aggregation processing execution unit 411 is to be distributed.

In addition, it is assumed that the load distribution determination unit 413 determines that the aggregation processing is to be distributed. In this case, the execution request transmission unit 415 transmits, to each of two or more nodes that are included in the node-responsible-for-aggregation group and that are different from the self-node, an execution request for aggregation processing for aggregating pieces of performance information of nodes belonging to one of groups obtained by dividing, by the number of the two or more nodes concerned, the node-responsible-for-aggregation group. Here, the relevant aggregation processing is the second aggregation processing 121 illustrated in FIG. 1 in a case of the execution request transmission unit 415#3 and is the zeroth aggregation processing 120 illustrated in FIG. 1 in a case of the execution request transmission unit 415#1.

The instruction unit 417 instructs other nodes. Specifically, it is assumed that the execution request transmission unit 415 transmits execution requests. In this case, to each of nodes belonging to a corresponding one of the groups obtained by dividing, by the number of the two or more nodes concerned, the node-responsible-for-aggregation group, the instruction unit 417 transmits an instruction to change a transmission destination of the performance information 112 of the relevant node to a node to execute appropriate aggregation processing for the corresponding one of groups. Furthermore, the instruction unit 417 transmits, to each of the two or more nodes, an instruction to transmit, to the self-node, a processing result of the aggregation processing executed by the relevant node.

In addition, in some cases, the aggregation unit 403 the type of which is the parent aggregation unit receives, from a first node, a change request to change, to another node, an execution destination of the second aggregation processing 122 executed by the first node, the first node being included in the two or more nodes concerned, to which a load on the first aggregation processing 121 of the aggregation unit 403 itself is distributed. While, here, being one of the nodes serving as destinations to which a load on the aggregation unit 403 itself is distributed and serving as the child aggregation unit, the first node serves as the parent aggregation unit in a case of generating a new child. In addition, hereinafter, the change request will be called a "responsibility change request".

In a case where the responsibility change request is received, the change destination node determination unit 414 determines, based on loads indicated by the pieces of load information 111 included in the pieces of performance information 112 of the node-responsible-for-aggregation group, a second node to be caused to execute the second aggregation processing 122 executed by the first node, from among the node-responsible-for-aggregation group. Here, the second node is a node that is included in the node-responsible-for-aggregation group and that is different from the self-node and nodes including the respective aggregation units 403. The second node is a node having the lowest load among nodes that are included in the node-responsible-for-aggregation group and that are different from the self-node and nodes including the respective aggregation units 403, for example. In addition, regarding the second node, in a case where a node having the lowest load among nodes that are included in the node-responsible-for-aggregation group and that are different from the self-node is the first node, the change destination node determination unit 414 does not have to change an execution destination of the second aggregation processing 122 executed by the first node and may determine that the second aggregation processing 122 executed by the first node is to be executed by the first node.

In addition, the execution request transmission unit 415 changes, from the first node to the second node, an execution destination of the second aggregation processing 122 executed by the first node. In addition, to each of nodes of the node-responsible-for-aggregation group, the instruction unit 417 transmits an instruction to change, to the second node, a transmission destination of performance information of the relevant node. Furthermore, the instruction unit 417 transmits, to the second node, an instruction to transmit, to the self-node, a processing result of the second aggregation processing 122 executed by the second node. The responsibility change request will be described in more detail in FIG. 12.

In addition, in some cases, the aggregation unit 403 the type of which is the parent aggregation unit receives, from a third node, a disappearance request to cause the second aggregation processing 122 executed by the third node to disappear, the third node being included in the two or more nodes concerned, to which a load on the first aggregation processing 121 of the aggregation unit 403 itself is distributed. In a case where the disappearance request is received, the disappearance determination unit 416 determines, based on a load on the self-node, whether or not to cause the second aggregation processing 122 executed by the third node to disappear. In a case where a load on the self-node is less than or equal to, for example, a predetermined threshold value, the disappearance determination unit 416 may determine that the second aggregation processing 122 executed by the third node is to be caused to disappear. Alternatively, in a case where a value obtained by adding a load on the third node to a load on the self-node is less than or equal to a predetermined threshold value, the disappearance determination unit 416 may determine that the second aggregation processing 122 executed by the third node is to be caused to disappear.

In addition, it is assumed that the disappearance determination unit 416 determines that the second aggregation processing 122 executed by the third node is to be caused to disappear. In this case, to each of nodes that are included in the node-responsible-for-aggregation group and that are aggregated by the third node, the instruction unit 417 transmits an instruction to change, to the second node, a transmission destination of the performance information 112 of the relevant node. Furthermore, the instruction unit 417 transmits, to the third node, an instruction to cause the second aggregation processing 122 executed by the third node to disappear.

In addition, in a case where an execution request for the first aggregation processing is received from a fourth node included in the nodes, the aggregation processing execution unit 411 executes the first aggregation processing 121. In a case of, for example, the aggregation processing execution unit 411#3, the fourth node is the node #1.

In addition, a case where a new node is added to the nodes or a case where one of the nodes is removed will be assumed. In this case, if the aggregation processing is distributed, the instruction unit 417 located in the representative node transmits, to the aggregation unit 403 serving as the child aggregation unit, an instruction to cancel the distribution of the aggregation processing. Here, adding a node is called "increasing", and removing a node is called "decreasing".

Figure 6:
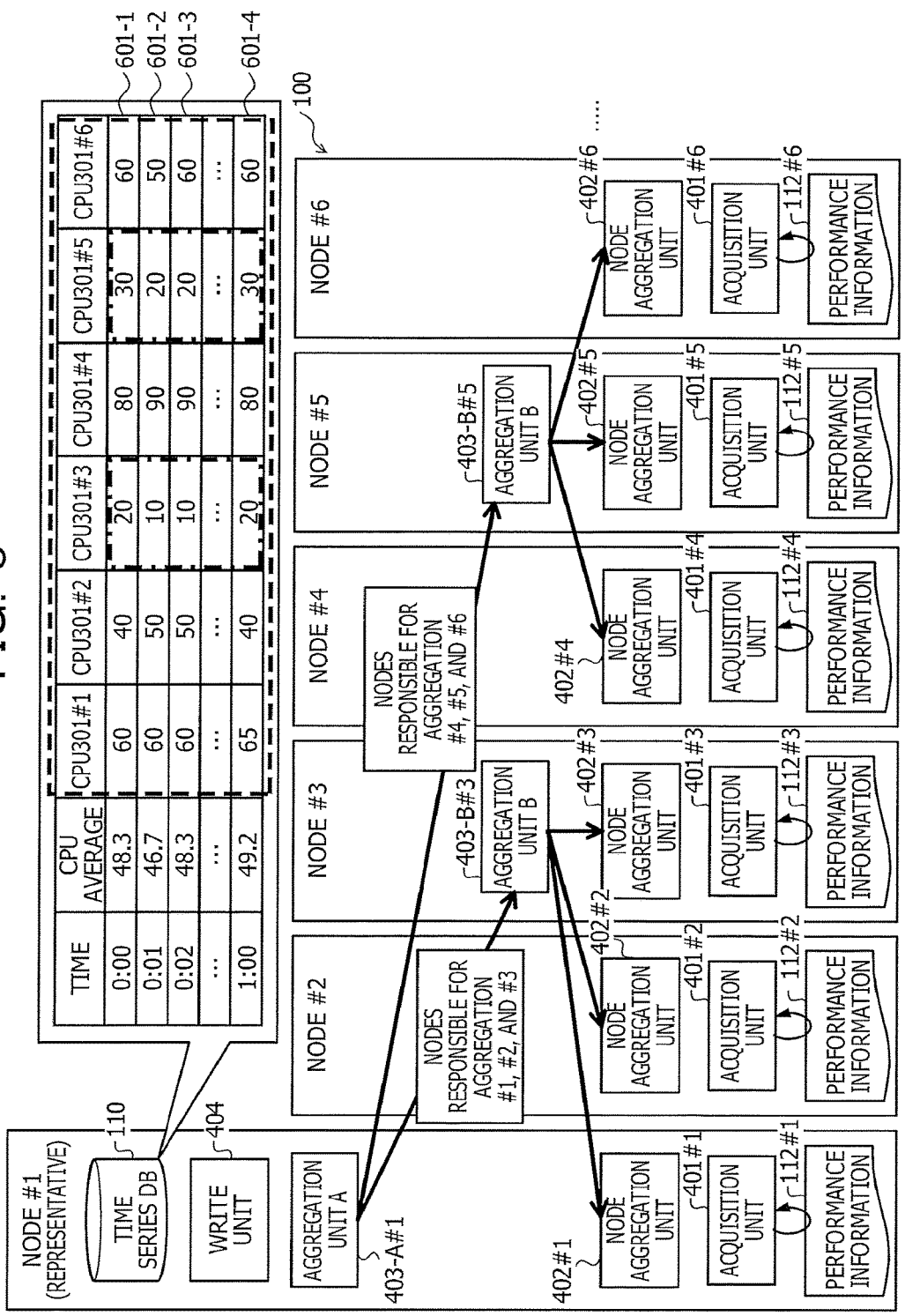
FIG. 6 is an explanatory diagram illustrating an example of a case of an increase in a load on the first node.
Figure 7:
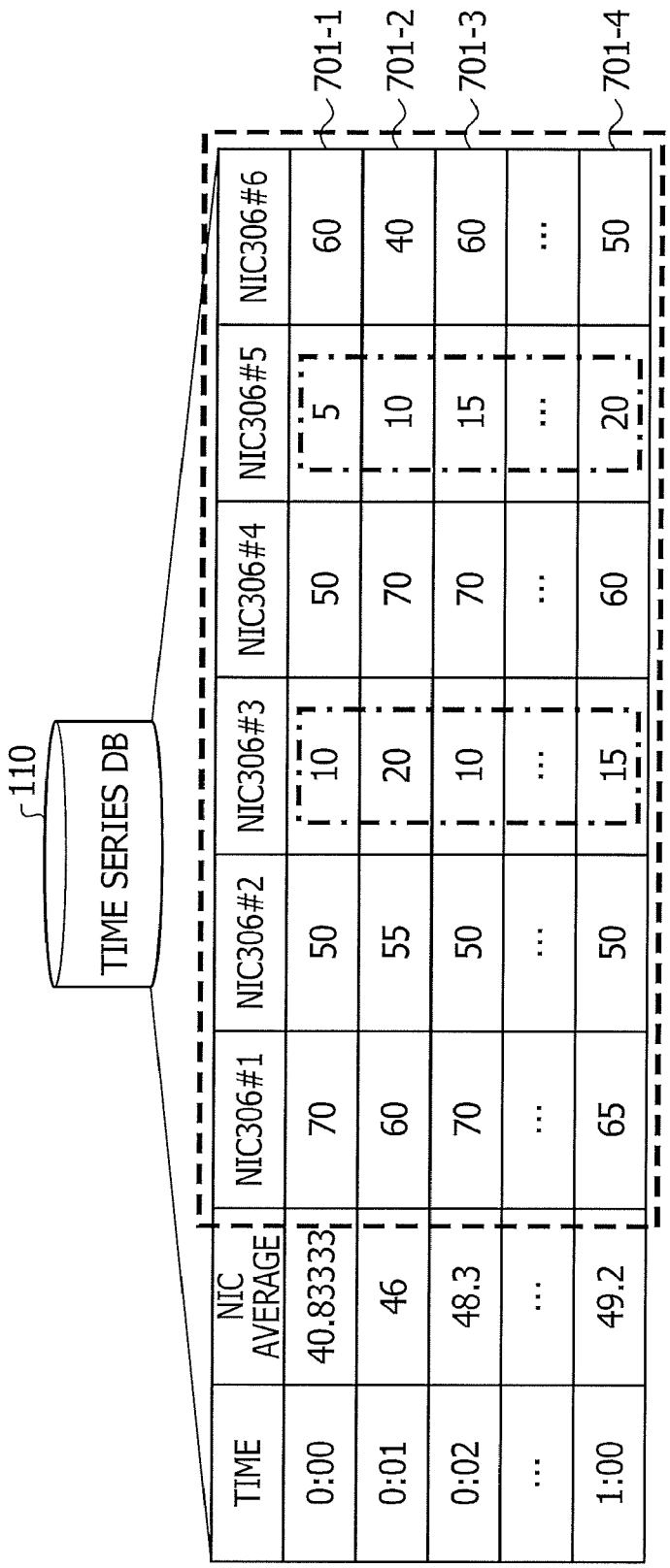
FIG. 7 is an explanatory diagram illustrating another example of a storage content of a time series DB.

The write unit 404 writes, to the time series DB 110, an aggregation value from the aggregation unit 403 and the pieces of performance information 112 of respective nodes while associating the aggregation value from the aggregation unit 403 and the pieces of performance information 112 of respective nodes with time information. Examples of storage contents of the time series DB 110 are illustrated in FIG. 6, FIG. 7, and so forth.

Next, a flow of data related to aggregation of the pieces of performance information 112 in the information processing system 100 will be described by using FIG. 5 to FIG. 12.

Figure 5:
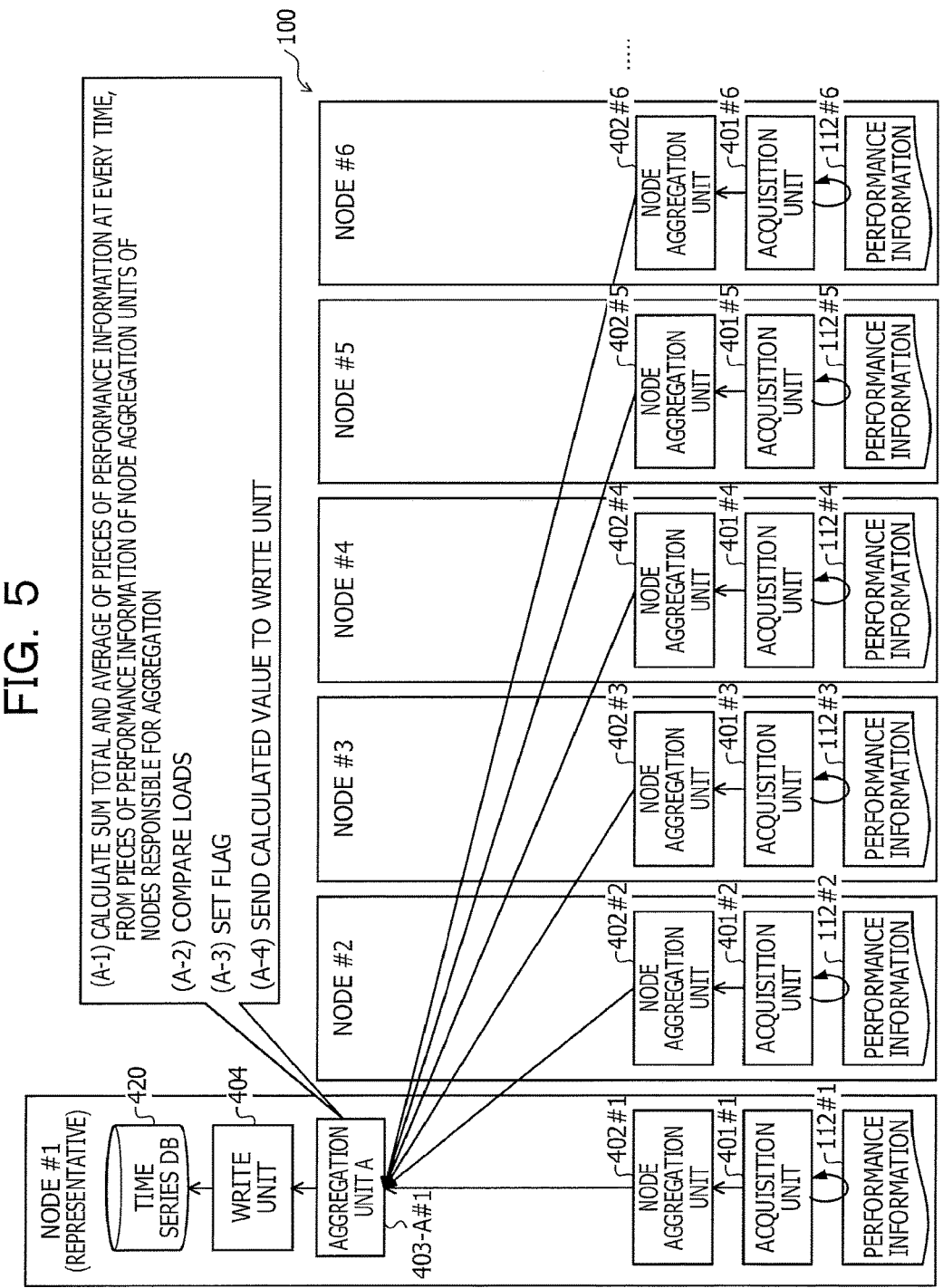
FIG. 5 is an explanatory diagram illustrating an example of collection of pieces of performance information in an initial state of the information processing system.

FIG. 5 is an explanatory diagram illustrating an example of collection of the pieces of performance information 112 in an initial state of the information processing system 100. In the initial state illustrated in FIG. 5, within the information processing system 100, the aggregation unit 403-A#1 only exists in the node #1 serving as the representative node. The node aggregation unit 402 of each of the respective nodes aggregates the performance information 112 acquired by the relevant node and transmits an aggregation value to the aggregation unit 403-A#1.

As illustrated by (A-1) in FIG. 5, the aggregation unit 403-A#1 further aggregates the transmitted aggregation values. In addition, as illustrated by (A-2) in FIG. 5, the aggregation unit 403-A#1 compares a CPU load on the self-node and a network load with a CPU average load and a network average load on the nodes responsible for aggregation, respectively. As illustrated by (A-3) in FIG. 5, in a case where, as a result of the comparison, a load on the self-node exceeds the average by a given value, the aggregation unit 403-A#1 sets a flag. After that, as illustrated by (A-4) in FIG. 5, the aggregation unit 403-A#1 transmits a calculated value to the write unit 404.

Here, regarding a case where CPU usage rates illustrated below are transmitted as pieces of CPU load information of the respective nodes, an example in which the aggregation unit 403-A#1 performs processing operations illustrated by (A-1) to (A-4) in FIG. 5 will be illustrated. It is assumed that the CPU usage rates of the nodes #1 to #6 are 60 [%], 50 [%], 10 [%], 90 [%], 20 [%], and 60 [%], respectively.

In (A-1) in FIG. 5, the aggregation unit 403-A#1 calculates the average of the CPU usage rates in accordance with the following calculation expression.

$$(60+50+10+90+20+60)/6=48.3$$

In addition, in (A-2) in FIG. 5, the aggregation unit 403-A#1 compares the CPU load on the self-node with the CPU load on the nodes responsible for aggregation in accordance with the following inequality expression. Here, it is assumed that a load determination value is 10 [%].

$$60>48.3+10$$

Since the above-mention inequality expression is true, the aggregation unit 403-A#1 sets a flag in (A-3) in FIG. 5. In addition, in (A-4) in FIG. 5, the aggregation unit 403-A#1 sends, as a calculated value, 48.3 [%] to the write unit 404.

FIG. 6 is an explanatory diagram illustrating an example of a case of an increase in a load on the node #1. FIG. 6 is a case where a load on the node #1 increases and the number of set flags exceeds a given number during a given period of time. In this case, the aggregation unit 403-A#1 references the time series DB 110, thereby generating the aggregation unit 403-B in each of two nodes that are included in nodes responsible for aggregation and that have lower loads.

Here, FIG. 6 illustrates an example of a storage content of the time series DB 110. In the time series DB 110 illustrated in FIG. 6, information related to CPU usage rates is stored.

In addition, the time series DB 110 illustrated in FIG. 6 includes records 601-1 to 601-4. Specifically, the time series DB 110 illustrated in FIG. 6 includes fields of a time, a CPU average, and usage rates of respective CPUs. Here, in FIG. 6, for the sake of simplicity of display, the usage rate fields of the CPUs only display symbols of the CPUs of the respective nodes. In the time field, a time at which the CPU usage rate is measured is stored. In the CPU average field, an average value of all CPU usage rates within the information processing system 100 is stored. In the usage rate fields of the respective CPUs, the usage rates of the respective CPUs are stored. In addition, a storage content of the time series DB 110 is not limited to the example of FIG. 6. FIG. 7 illustrates an example in which information related to usage rates of networks is stored in the time series DB 110.

An area separated by a dashed line of the time series DB 110 illustrated in FIG. 6 indicates the usage rates of the CPUs of the respective nodes responsible for aggregation. In addition, two nodes that are included in the individual nodes responsible for aggregation and that have lower loads are the nodes #3 and #5 surrounded by dashed-dotted lines. Therefore, the aggregation unit 403-A#1 generates the aggregation unit 403-B#3 in the node #3 and generates the aggregation unit 403-B#5 in the node #5. In addition, the aggregation unit 403-A#1 determines nodes responsible for aggregation of each of the aggregation units 403-B#3 and 403-B#5 and notifies each of the aggregation units 403-B#3 and 403-B#5 thereof. In the example of FIG. 6, the aggregation unit 403-A#1 determines, as nodes responsible for aggregation of the aggregation unit 403-B#3, the nodes #1, #2, and #3 and determines, as nodes responsible for aggregation of the aggregation unit 403-B#5, the nodes #4, #5, and #6, for example. In addition, each of the aggregation units 403-B#3 and 403-B#5 notifies nodes accepted as nodes responsible for aggregation of changing, to the self-node, transmission destinations of the pieces of performance information 112. In addition, a relationship between the aggregation unit 403-A#1 and the aggregation units 403-B#3 and 403-B#5 is a parent-child relationship in which the aggregation unit 403-A#1 serves as the parent aggregation unit and the aggregation units 403-B#3 and 403-B#5 each serve as the child aggregation unit.

FIG. 7 is an explanatory diagram illustrating another example of the storage content of the time series DB 110. In the time series DB 110 illustrated in FIG. 7, information related to networks is stored. In addition, the time series DB 110 illustrated in FIG. 7 includes records 701-1 to 701-4. Specifically, the time series DB 110 illustrated in FIG. 7 includes fields of a time, an NIC average, and usage rates of respective NICs. Here, in FIG. 7, for the sake of simplicity of display, the usage rate fields of the NICs only display symbols of the NICs of the respective nodes. In the time field, a time at which the network usage rate is measured is stored. In the NIC average field, an average value of usage rates of all NICs within the information processing system 100 is stored. In the usage rate fields of the respective NICs, the usage rates of the respective NICs are stored.

An area separated by a dashed line of the time series DB 110 illustrated in FIG. 7 indicates the usage rates of networks of the respective nodes responsible for aggregation. In addition, two nodes that are included in the individual nodes responsible for aggregation and that have lower loads are the nodes #3 and #5 surrounded by dashed-dotted lines. Accordingly, the aggregation unit 403-A#1 references the time series DB 110 illustrated in FIG. 7, thereby generating the aggregation unit 403-B#3 in the node #3 and generating the aggregation unit 403-B#5 in the node #5.

Figure 8:
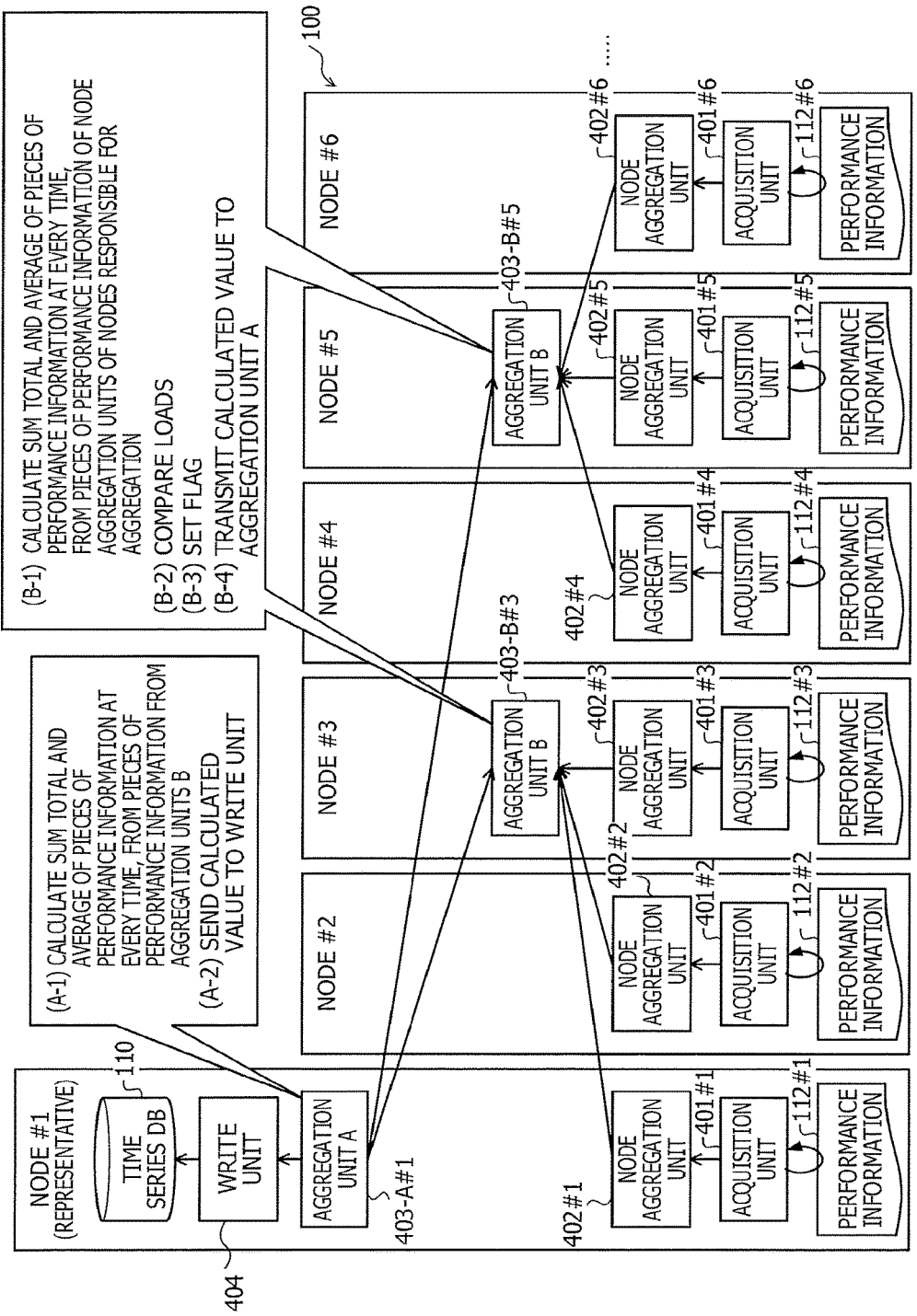
FIG. 8 is an explanatory diagram illustrating an example of collection of the pieces of performance information after creating aggregation units.

FIG. 8 is an explanatory diagram illustrating an example of collection of the pieces of performance information 112 after creating aggregation units 403-B. FIG. 8 illustrates a state after generating the aggregation units 403-B#3 and 403-B#5. The node aggregation unit 402 of each of nodes aggregates the performance information 112 acquired by the relevant node and transmits aggregation values to a node that is included in the nodes #3 and #5 and for which a notice that the relevant node is a transmission destination is issued.

As illustrated by (B-1) in FIG. 8, the aggregation units 403-B#3 and 403-B#5 each calculate a sum total and an average of aggregation values at every time from the transmitted aggregation values. In addition, as illustrated by (B-2) in FIG. 8, the aggregation units 403-B#3 and 403-B#5 each compare a CPU load and a network load on the self-node with a CPU average load and a network average load on the nodes responsible for aggregation, respectively. As illustrated by (B-3) in FIG. 8, in a case where, as a result of the comparison, a load on the self-node exceeds the average by a given value, each of the aggregation units 403-B#3 and 403-B#5 sets a flag. After that, as illustrated by (B-4) in FIG. 8, the aggregation units 403-B#3 and 403-B#5 each transmit a calculated value to the aggregation unit 403-A#1.

Here, regarding a case where CPU usage rates illustrated below are transmitted as pieces of CPU load information of the respective nodes, an example in which the aggregation unit 403-B#3 performs processing operations illustrated by (B-1) to (B-4) in FIG. 8 will be illustrated. It is assumed that the CPU usage rates of the nodes #1 to #3 are 10 [%], 20 [%], and 40 [%], respectively.

In (B-1) in FIG. 8, the aggregation unit 403-B#3 calculates the average of the CPU usage rates in accordance with the following calculation expression.

$$(10+20+40)/3=23.3$$

In addition, in (B-2) in FIG. 8, the aggregation unit 403-B#3 compares the CPU load on the self-node with the CPU load on the nodes responsible for aggregation in accordance with the following inequality expression. Here, it is assumed that a load determination value is 10 [%].

$$40 > 23.3 + 10$$

Since the above-mention inequality expression is true, the aggregation unit 403-B#3 sets a flag in (B-3) in FIG. 8. In addition, in (B-4) in FIG. 8, the aggregation unit 403-B#3 sends, as a calculated value, 23.3 [%] to the aggregation unit 403-A#1.

In addition, as illustrated by (A-1) in FIG. 8, the aggregation unit 403-A#1 calculates a sum total and an average of aggregation values at every time from the transmitted aggregation values. In addition, as illustrated by (A-2) in FIG. 8, the aggregation unit 403-A#1 sends a calculated value to the write unit 404.

Figure 9:
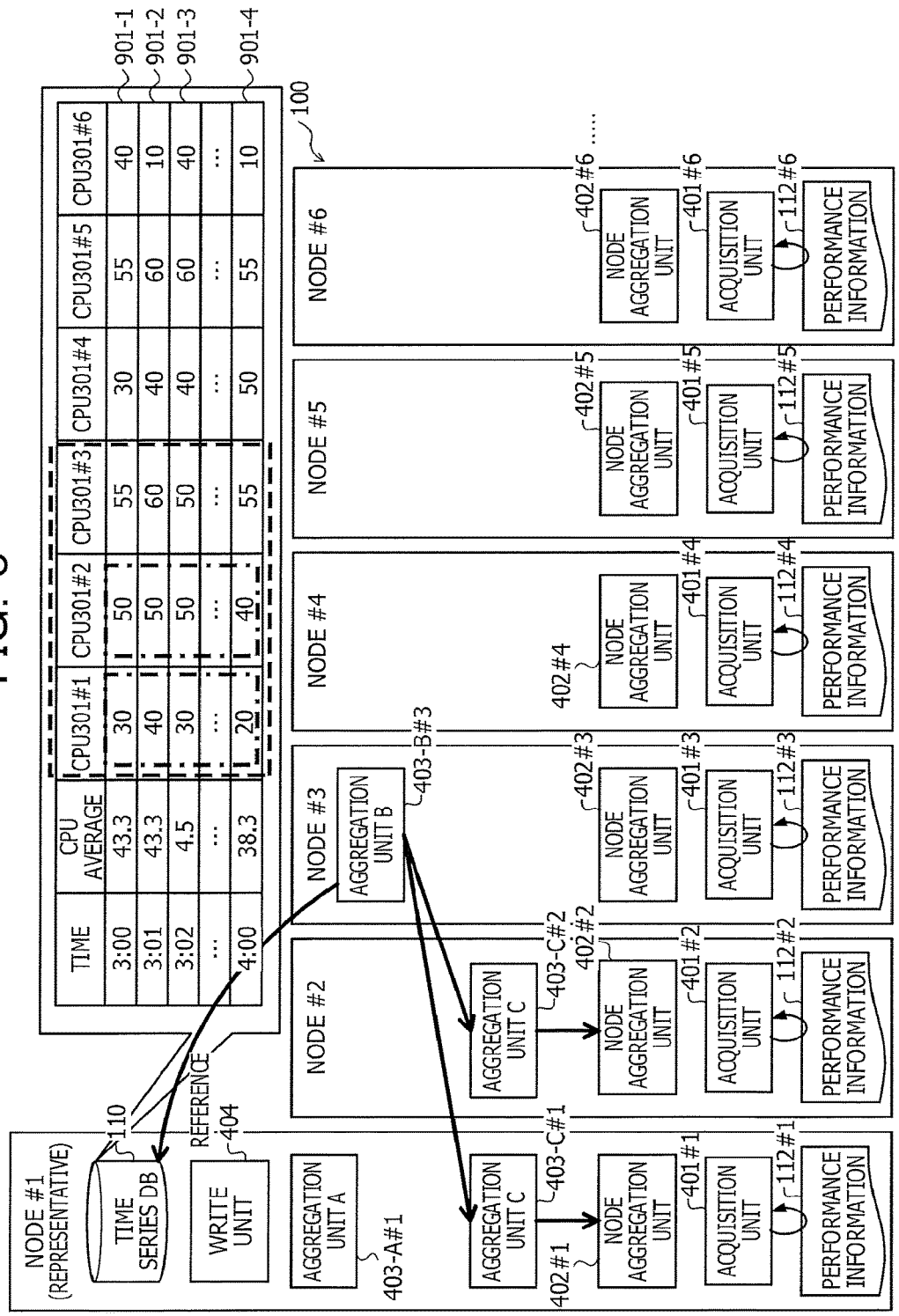
FIG. 9 is an explanatory diagram illustrating an example of a case of an increase in a load on a third node.

FIG. 9 is an explanatory diagram illustrating an example of a case of an increase in a load on the node #3. FIG. 9 is a case where a load on the node #3 increases and the number of set flags exceeds a given number during a given period of time. In this case, the aggregation unit 403-B#3 references the time series DB 110, thereby generating the aggregation unit 403-C in each of two nodes that are included in the nodes responsible for aggregation and that have lower loads.

Here, FIG. 9 illustrates an example of a storage content of the time series DB 110. In the time series DB 110 illustrated in FIG. 9, information related to CPU usage rates is stored. In addition, the time series DB 110 illustrated in FIG. 9 includes records 901-1 to 901-4.

An area separated by a dashed line of the time series DB 110 illustrated in FIG. 9 indicates the usage rates of CPUs of respective nodes responsible for aggregation of the node #3. In addition, two nodes that are included in the individual nodes responsible for aggregation and that have lower loads are the nodes #1 and #2 surrounded by dashed-dotted lines. Therefore, the aggregation unit 403-B#3 generates the aggregation unit 403-C#1 in the node #1 and generates the aggregation unit 403-C#2 in the node #2. The aggregation unit 403-B#3 determines nodes responsible for aggregation of each of the aggregation units 403-C#1 and 403-C#2 and notifies each of the aggregation units 403-C#1 and 403-C#2 thereof. In the example of FIG. 9, the aggregation unit 403-B#3 determines, as a node responsible for aggregation of the aggregation unit 403-C#1, the node #1 and determines, as nodes responsible for aggregation of the aggregation unit 403-C#2, the nodes #2 and #3, for example. In addition, each of the aggregation units 403-C#1 and 403-C#2 notifies nodes accepted as nodes responsible for aggregation of changing, to the self-node, transmission destinations of the pieces of performance information 112. In addition, a relationship between the aggregation unit 403-B#3 and the aggregation units 403-C#1 and 403-C#2 is a parent-child relationship in which the aggregation unit 403-B#3 serves as the parent aggregation unit and the aggregation units 403-C#1 and 403-C#2 each serve as the child aggregation unit.

Figure 10:
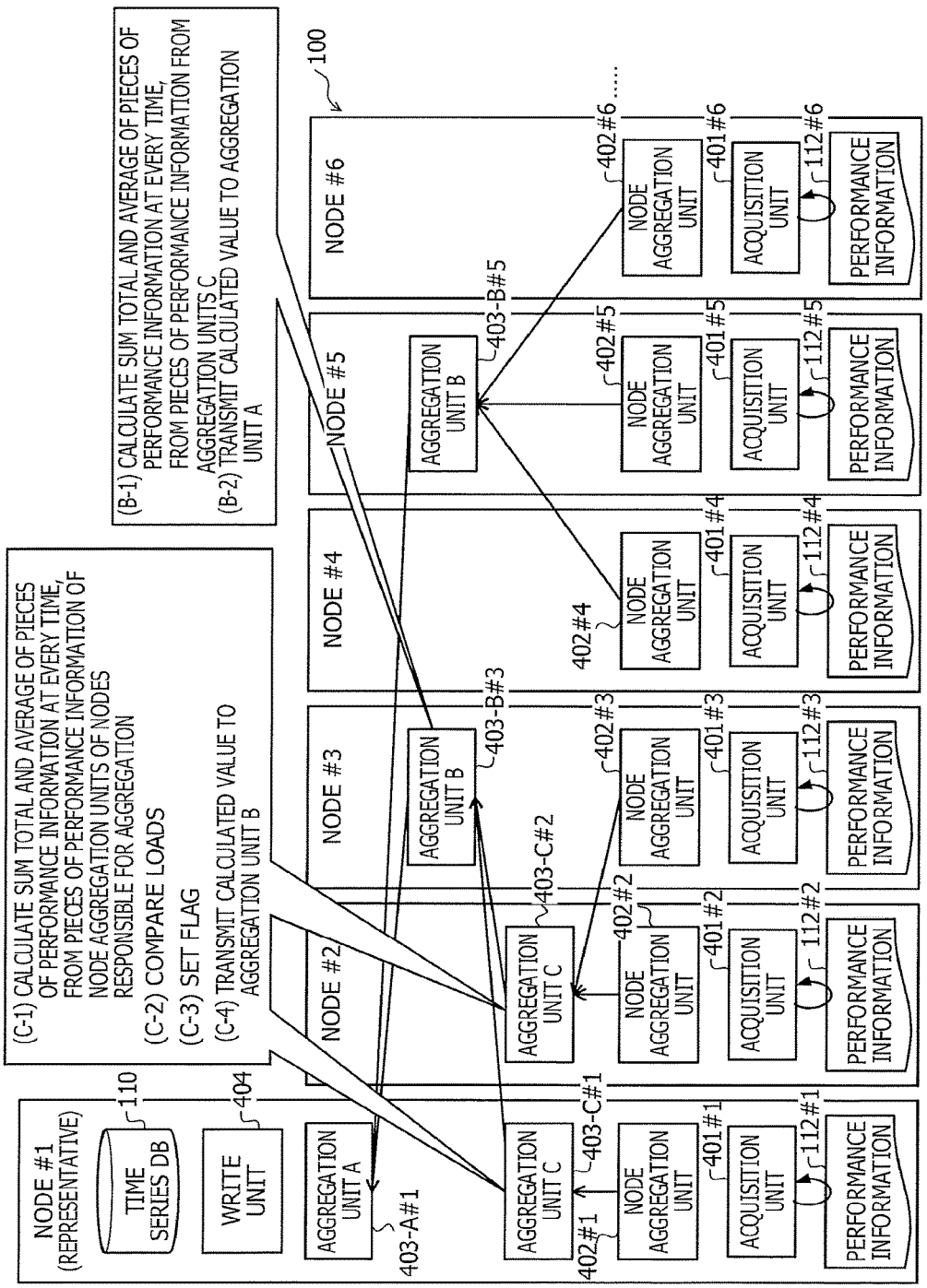
FIG. 10 is an explanatory diagram illustrating an example of collection of the pieces of performance information after creating aggregation units.

FIG. 10 is an explanatory diagram illustrating an example of collection of the pieces of performance information 112 after creating the aggregation units 403-C. FIG. 10 illustrates a state after generating the aggregation units 403-C#1 and 403-C#2. The node aggregation unit 402 of each of nodes aggregates the performance information 112 acquired by the relevant node and transmits aggregation values to a node that is included in the nodes #1 and #2 and for which a notice that the relevant node is a transmission destination is issued.

As illustrated by (C-1) in FIG. 10, the aggregation units 403-C#1 and 403-C#2 each calculate a sum total and an average of aggregation values at every time from the transmitted aggregation values. In addition, as illustrated by (C-2) in FIG. 10, the aggregation units 403-C#1 and 403-C#2 each compare a CPU load and a network load on the self-node with a CPU average load and a network average load on the nodes responsible for aggregation, respectively. As illustrated by (C-3) in FIG. 10, in a case where, as a result of the comparison, a load on the self-node exceeds the average by a given value, each of the aggregation units 403-C#1 and 403-C#2 sets a flag. After that, as illustrated by (C-4) in FIG. 10, the aggregation units 403-C#1 and 403-C#2 each transmit a calculated value to the aggregation unit 403-B#3.

As illustrated by (B-1) in FIG. 10, the aggregation unit 403-B#3 calculates a sum total and an average of aggregation values at every time from the transmitted aggregation values. In addition, as illustrated by (B-2) in FIG. 10, the aggregation unit 403-B#3 transmits a calculated value to the aggregation unit 403-A#1.

Figure 11:
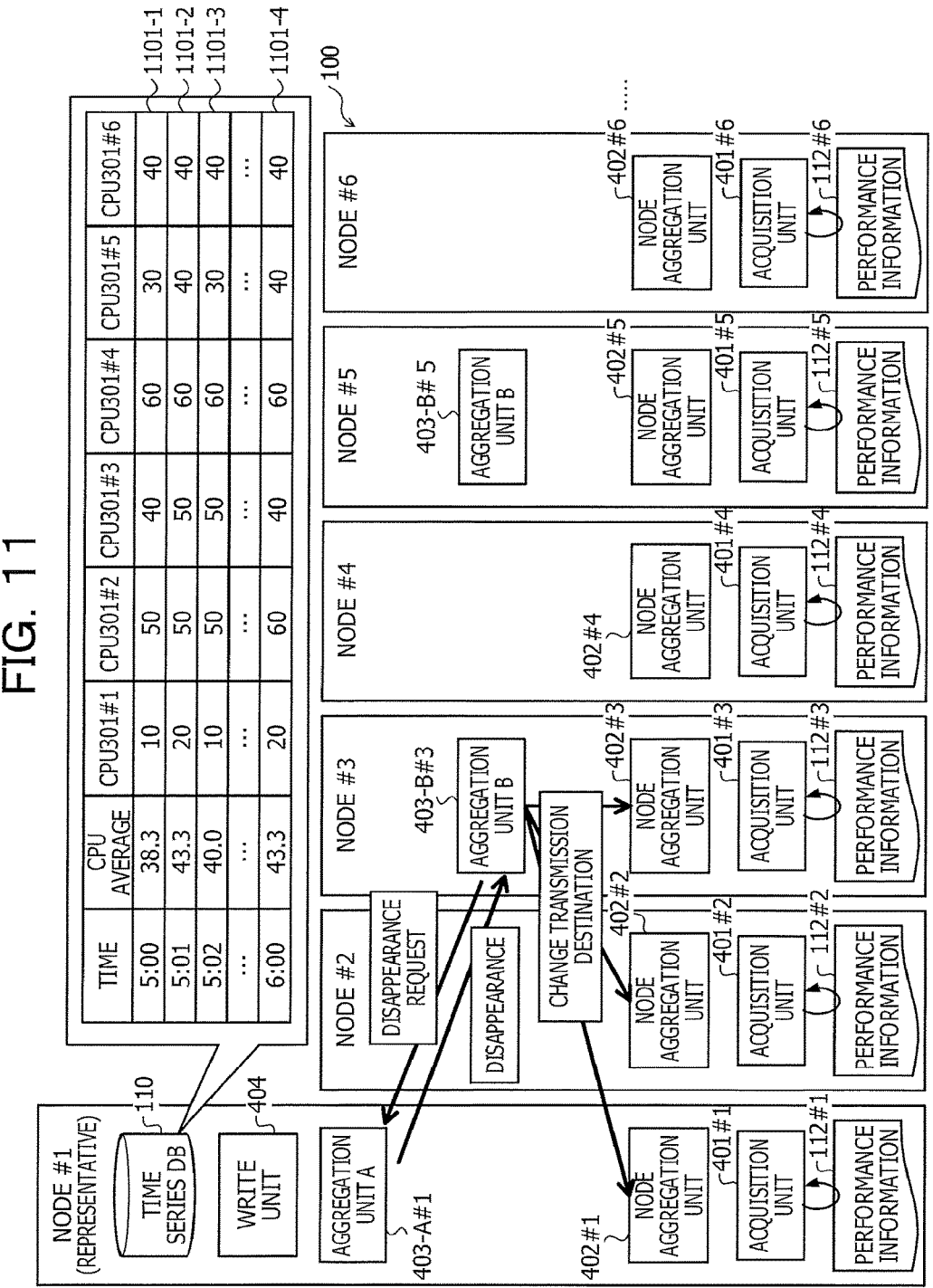
FIG. 11 is an explanatory diagram illustrating an example of a case of a decrease in a load on the third node.

FIG. 11 is an explanatory diagram illustrating an example of a case of a decrease in a load on the node #3. FIG. 11 is a case where, after the state illustrated in FIG. 8, a load on the node #3 decreases and the number of set low-load flags exceeds a given number during a given period of time. In this case, the aggregation unit 403-B#3 transmits, to the aggregation unit 403-A#1 serving as the parent aggregation unit of the aggregation unit 403-B#3, a disappearance request indicating a request to cause the aggregation unit 403 to disappear. The aggregation unit 403-A#1 that receives the disappearance request references the time series DB 110, and in a case where a load on the aggregation unit 403-A#1 itself is low, the aggregation unit 403-A#1 causes the aggregation unit 403-B#3 serving as the child aggregation unit to disappear.

After notifying the nodes responsible for aggregation of changing a delivery destination to the aggregation unit 403-A#1 serving as the parent aggregation unit, the aggregation unit 403-B#3 disappears. On the other hand, in a case where a load on the aggregation unit 403-A#1 itself is not low, the aggregation unit 403-A#1 does not cause the child aggregation unit to disappear.

Here, FIG. 11 illustrates an example of a storage content of the time series DB 110. In the time series DB 110 illustrated in FIG. 11, information related to CPU usage rates is stored. In addition, the time series DB 110 illustrated in FIG. 11 includes records 1101-1 to 1101-4.

In the example illustrated in FIG. 11, as illustrated by the records 1101-1 to 1101-4, a CPU load on the node #1 is in a low state. Therefore, the aggregation unit 403-B#3 is caused to disappear. The aggregation unit 403-B#3 notifies the nodes #1 to #3 serving as nodes responsible for aggregations of the aggregation unit 403-B#3 itself of changing transmission destinations of the pieces of performance information 112 to the node #1.

Figure 12:
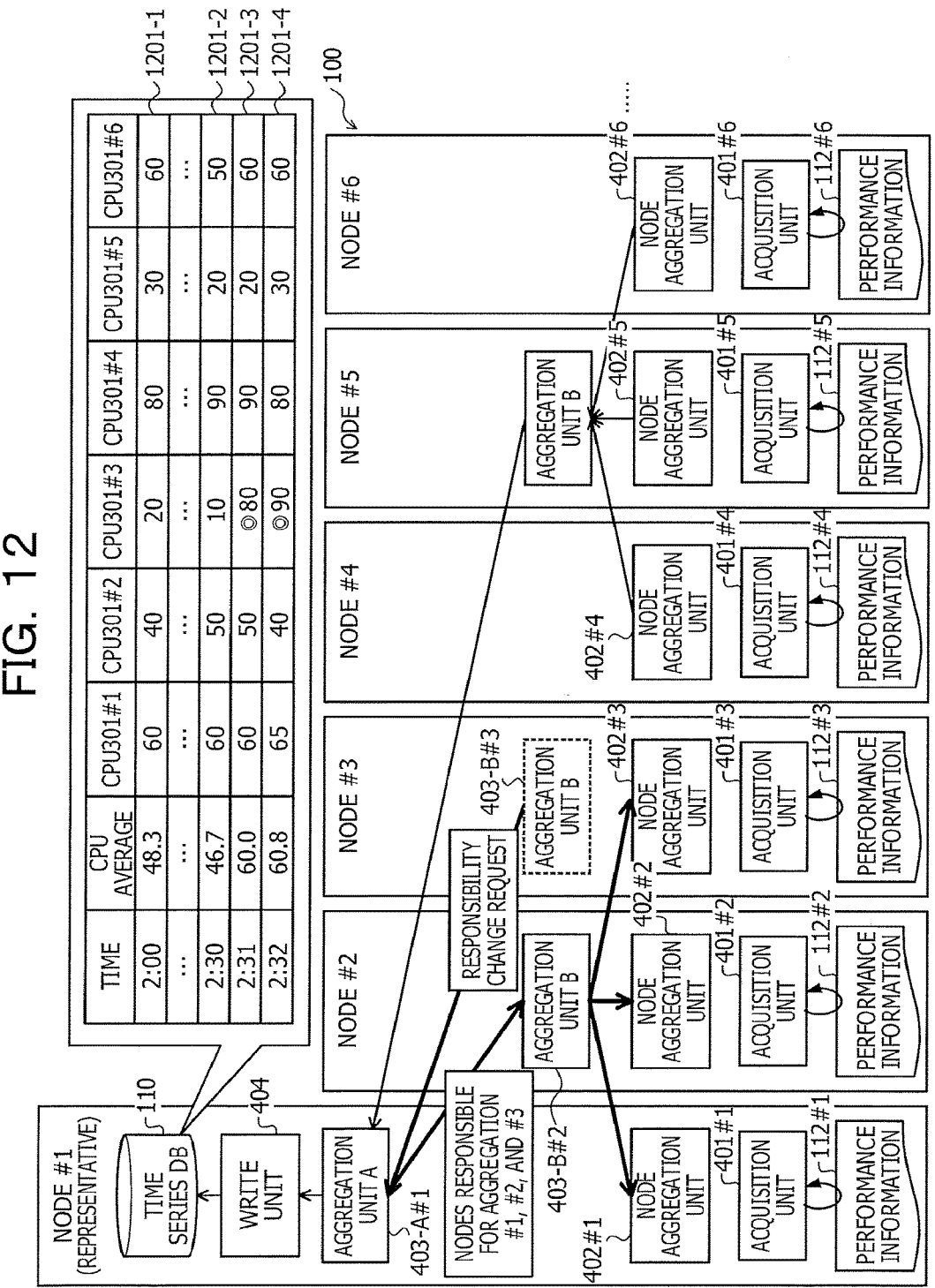
FIG. 12 is an explanatory diagram illustrating an example of a case of a considerable increase in a load on the third node.

FIG. 12 is an explanatory diagram illustrating an example of a case of a considerable increase in a load on the node #3. FIG. 12 is a case where, after the state illustrated in FIG. 8, a load on the node #3 considerably increases and the number of set high-load flags exceeds a given number during a given period of time. In this case, the aggregation unit 403-B#3 transmits, to the aggregation unit 403-A#1 serving as the parent aggregation unit of the aggregation unit 403-B#3, a responsibility change request indicating a request to change a responsibility for aggregating the pieces of performance information 112. The aggregation unit 403-A#1 that receives the responsibility change request references the time series DB 110 and newly generates the child aggregation unit in a node having the lowest load among the nodes #1 to #3 serving as the nodes responsible for aggregation of the aggregation unit 403-B#3. After generating the new child aggregation unit, the aggregation unit 403-A#1 causes the old child aggregation unit to disappear.

Here, FIG. 12 illustrates an example of a storage content of the time series DB 110. In the time series DB 110 illustrated in FIG. 12, information related to CPU usage rates is stored. In addition, the time series DB 110 illustrated in FIG. 12 includes records 1201-1 to 1201-4.

In the example illustrated in FIG. 12, as illustrated by double circles of the records 1201-3 and 1201-4, a load on the node #3 considerably increases. In addition, the aggregation unit 403-A#1 references the time series DB 110 and generates, as the new child aggregation unit, the aggregation unit 403-B#2 in the node #2 having the lowest load among the nodes #1 to #3. In addition, the aggregation unit 403-A#1 causes the aggregation unit 403-B#3 to disappear. In FIG. 12, a dashed line is used as an outline of the aggregation unit 403-B#3, thereby schematically indicating that the aggregation unit 403-B#3 disappears.

In addition, while not illustrated, in a case where nodes are increased or decreased, the aggregation unit 403-A#1 serving as the topmost parent aggregation unit causes the aggregation units 403 other than the aggregation unit 403-A#1 itself to disappear and notifies the node aggregation units 402 of all nodes of changing transmission destinations to the aggregation unit 403-A#1. After the notification, the aggregation unit 403-A#1 repeats the processing operations illustrated in FIG. 5 to FIG. 12.

Next, flowcharts indicating processing executed by the information processing system 100 will be described by using FIG. 13 to FIG. 18.

Figure 13:
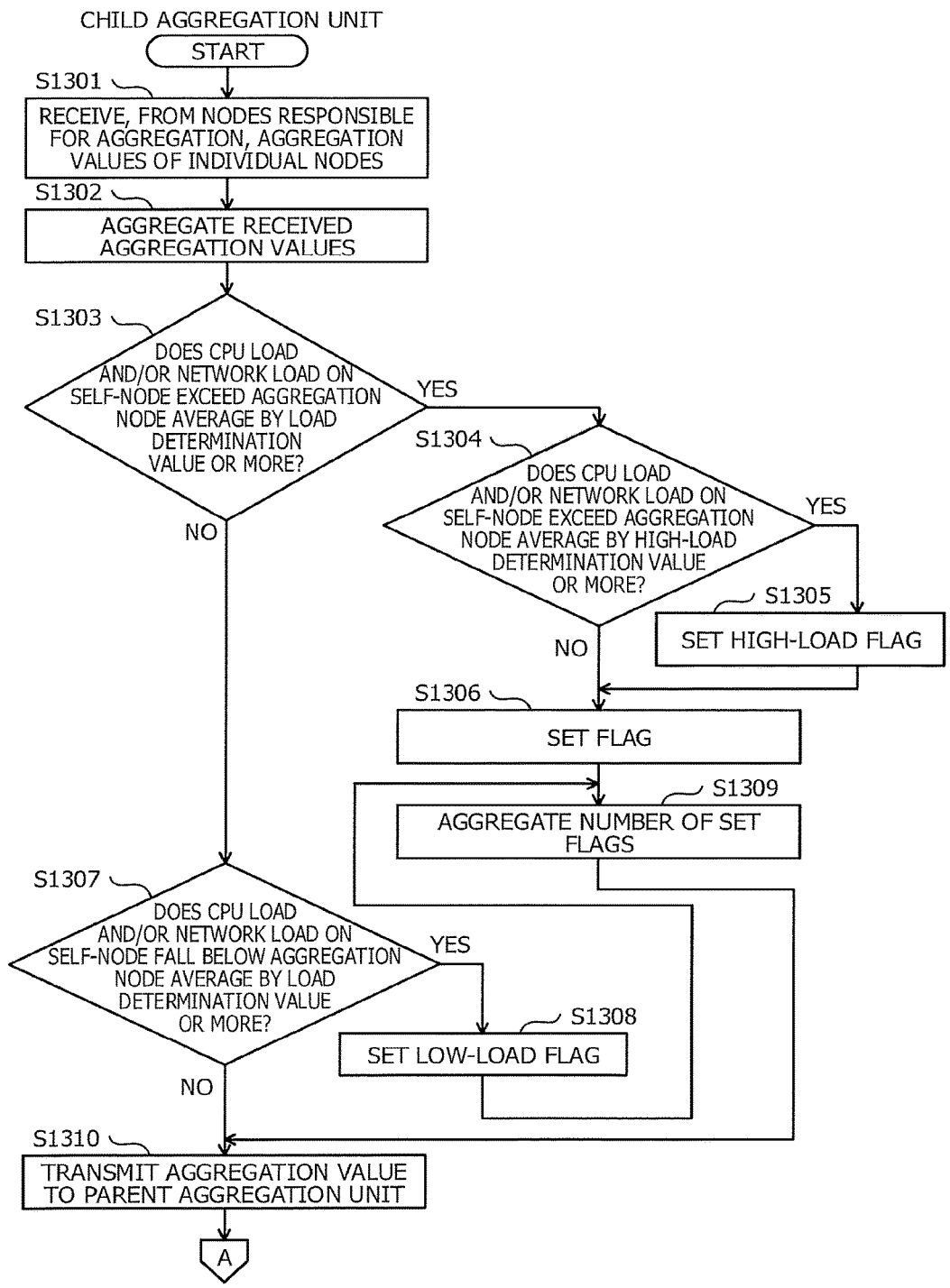
FIG. 13 is a flowchart (part one) illustrating an example of a procedure of performance information collection processing in a child aggregation unit.
Figure 14:
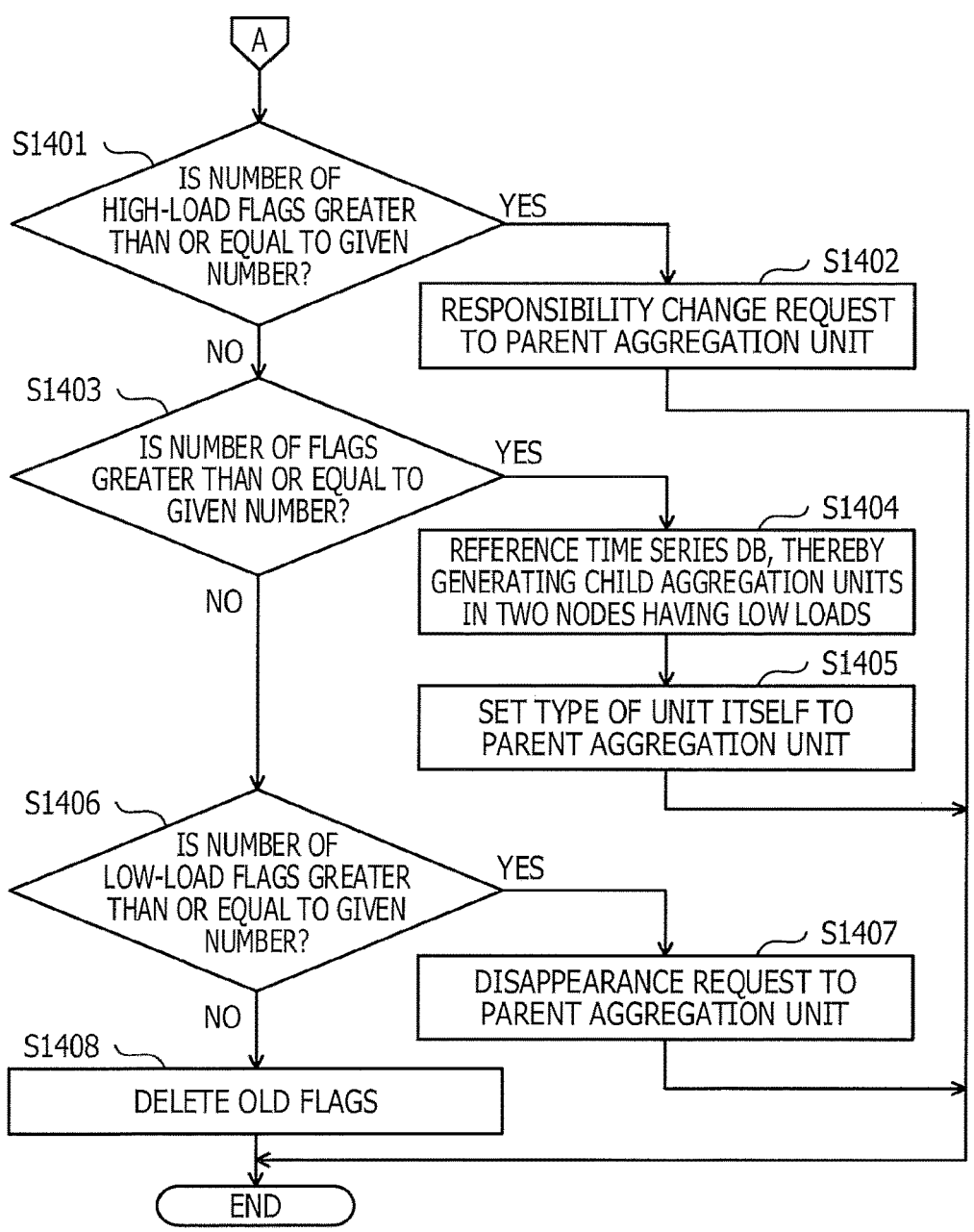
FIG. 14 is a flowchart (part two) illustrating an example of the procedure of the performance information collection processing in the child aggregation unit.

FIG. 13 is a flowchart (part one) illustrating an example of a procedure of performance information collection processing in the child aggregation unit. In addition, FIG. 14 is a flowchart (part two) illustrating an example of the procedure of the performance information collection processing in the child aggregation unit. The performance information collection processing executed in the child aggregation unit and illustrated in FIG. 13 and FIG. 14 is processing executed by the aggregation unit 403 the type of which is the child aggregation unit. In addition, the performance information collection processing executed in the child aggregation unit and illustrated in FIG. 13 and FIG. 14 is periodically executed.

The aggregation unit 403 receives, from nodes responsible for aggregation, aggregation values of the individual nodes (step S1301). Next, the aggregation unit 403 further aggregates the received aggregation values (step S1302). In addition, the aggregation unit 403 determines whether or not a CPU load and/or a network load on the self-node exceeds an aggregation node average by a load determination value or more (step S1303). In a case where the CPU load and/or the network load on the self-node exceeds the aggregation node average by the load determination value or more (step S1303: Yes), the aggregation unit 403 determines whether or not the CPU load and/or the network load on the self-node exceeds the aggregation node average by a high-load determination value or more (step S1304).

In a case where the CPU load and/or the network load on the self-node exceeds the aggregation node average by the high-load determination value or more (step S1304: Yes), the aggregation unit 403 sets a high-load flag (step S1305). In addition, after the processing operation in step S1305 finishes or in a case where the CPU load and/or the network load on the self-node does not exceed the aggregation node average by the high-load determination value or more (step S1304: No), the aggregation unit 403 sets a flag (step S1306).

On the other hand, in a case where the CPU load and/or the network load on the self-node does not exceed the aggregation node average by the load determination value or more (step S1303: No), the aggregation unit 403 determines whether or not the CPU load and/or the network load on the self-node falls below the aggregation node average by a load determination value or more (step S1307).

In a case where the CPU load and/or the network load on the self-node falls below the aggregation node average by the load determination value or more (step S1307: Yes), the aggregation unit 403 sets a low-load flag (step S1308). After the processing operation in step S1306 or step S1308 finishes, the aggregation unit 403 aggregates the number of set flags (step S1309).

After the processing operation in step S1309 finishes or in a case where the CPU load and/or the network load on the self-node does not fall below the aggregation node average by the load determination value or more (step S1307: No), the aggregation unit 403 transmits an aggregation value to the parent aggregation unit (step S1310). In addition, the aggregation unit 403 determines whether or not the number of high-load flags is greater than or equal to a given number (step S1401).

In a case where the number of high-load flags is greater than or equal to the given number (step S1401: Yes), the aggregation unit 403 transmits a responsibility change request to the parent aggregation unit (step S1402). On the other hand, in a case where the number of high-load flags is less than the given number (step S1401: No), the aggregation unit 403 determines whether or not the number of flags is greater than or equal to a given number (step S1403). In a case where the number of flags is greater than or equal to the given number (step S1403: Yes), the aggregation unit 403 references the time series DB 110, thereby generating the child aggregation units in two nodes that are included in the nodes responsible for aggregation and that have low loads (step S1404). In addition, the aggregation unit 403 sets the type of the aggregation unit 403 itself to the parent aggregation unit (step S1405).

On the other hand, in a case where the number of flags is less than the given number (step S1403: No), the aggregation unit 403 determines whether or not the number of low-load flags is greater than or equal to a given number (step S1406). In a case where the number of low-load flags is greater than or equal to the given number (step S1406: Yes), the aggregation unit 403 transmits a disappearance request to the parent aggregation unit (step S1407).

On the other hand, in a case where the number of low-load flags is less than the given number (step S1406: No), the aggregation unit 403 deletes old flags (step S1408). Here, the old flags are flags for which a given period of time or more has elapsed after the old flags were set, for example.

After the processing operation in one of steps S1402, S1405, S1407, and S1408 finishes, the aggregation unit 403 terminates the performance information collection processing in the child aggregation unit.

Here, in a case where, as described in FIG. 4, only one of the aggregation units 403 exists within the information processing system 100, the relevant aggregation unit 403 is located in the representative node, the type thereof is the child aggregation unit, and therefore, the relevant aggregation unit 403 performs the processing illustrated in FIG. 13 and FIG. 14. In addition, the relevant aggregation unit 403 writes an aggregation value to the write unit 404 in place of the processing operation in step S1310. In addition, even in a case of "step S1401: Yes" or "step S1406: Yes", the relevant aggregation unit 403 performs no processing operation in step S1402 and no processing operation in step S1407.

Figure 15:
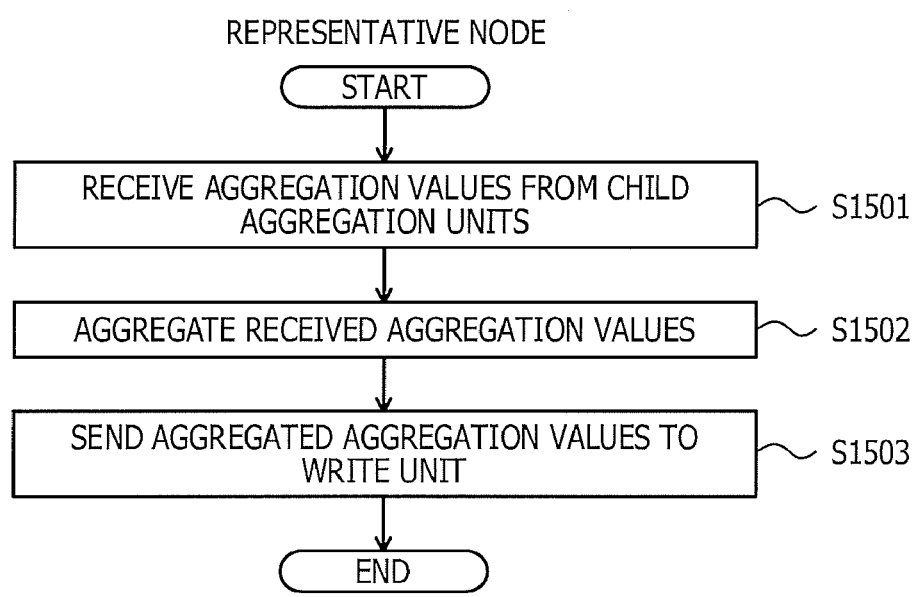
FIG. 15 is a flowchart illustrating an example of a procedure of performance information collection processing in a parent aggregation unit in a representative node.

FIG. 15 is a flowchart illustrating an example of a procedure of performance information collection processing in the parent aggregation unit in the representative node. The performance information collection processing in the parent aggregation unit in the representative node is the performance information collection processing in a case where the type of the aggregation unit 403 in the representative node is the parent aggregation unit. The performance information collection processing in the parent aggregation unit in the representative node is periodically executed.

The aggregation unit 403 receives aggregation values from the child aggregation units (step S1501). Next, the aggregation unit 403 aggregates the received aggregation values (step S1502). In addition, the aggregation unit 403 sends the aggregated aggregation values to the write unit 404 (step S1503). After the processing operation in step S1503 finishes, the aggregation unit 403 terminates the performance information collection processing in the parent aggregation unit in the representative node.

In addition, the aggregation unit 403 serving as the parent aggregation unit in a node different from the representative node performs approximately the same processing as the processing illustrated in FIG. 15. As a difference therebetween, in the processing operation in step S1503, the relevant aggregation unit 403 transmits the aggregated aggregation values to the parent aggregation unit in the relevant aggregation unit 403 itself.

Figure 16:
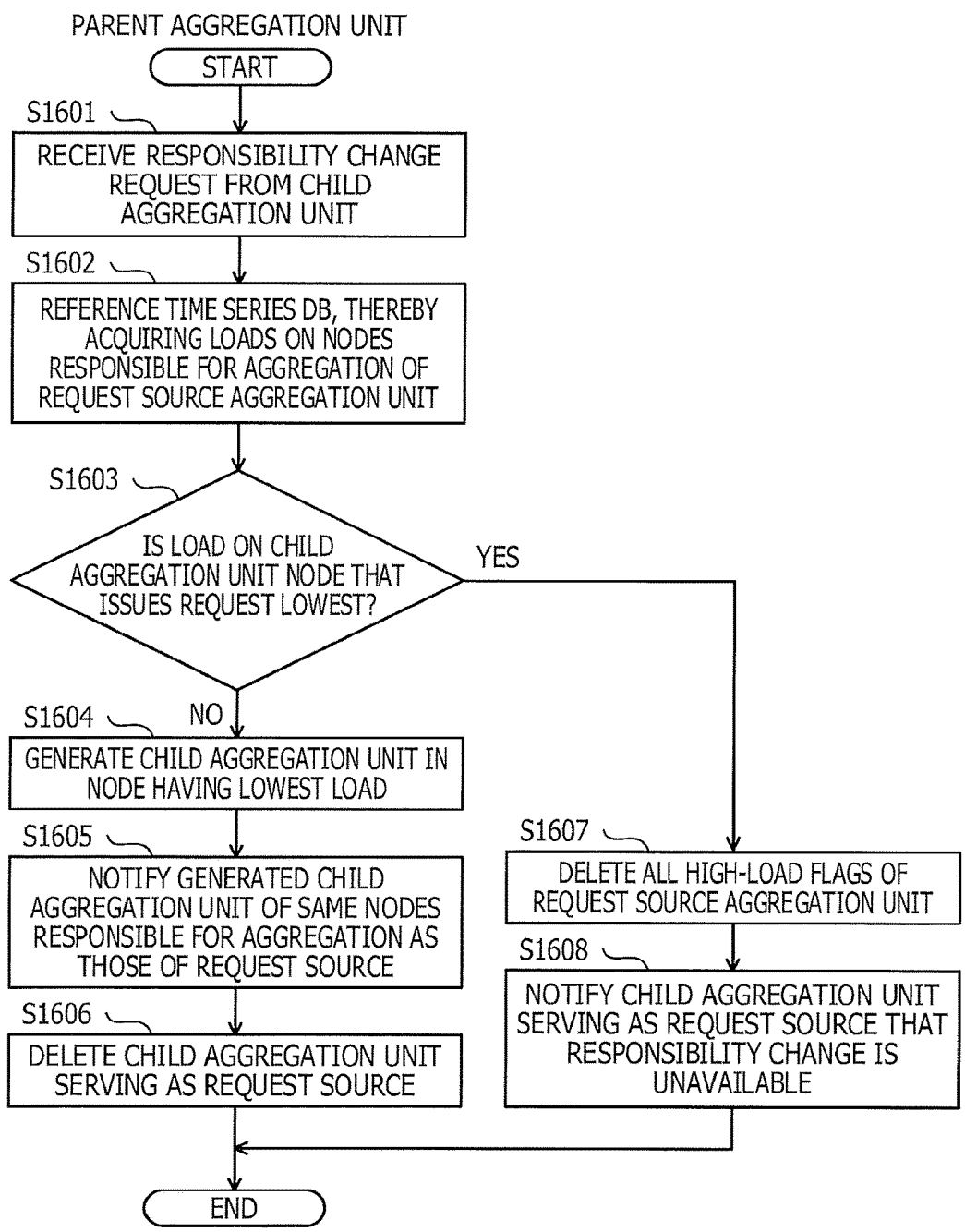
FIG. 16 is a flowchart illustrating an example of a procedure of processing at a time of reception of a responsibility change request in the parent aggregation unit.

FIG. 16 is a flowchart illustrating an example of a procedure of processing at a time of reception of a responsibility change request in the parent aggregation unit. The processing at a time of reception of a responsibility change request in the parent aggregation unit is processing at a time when the aggregation unit 403 serving as the parent aggregation unit receives the responsibility change request from the aggregation unit 403 serving as the child aggregation unit of the aggregation unit 403 itself serving as the parent aggregation unit. In this way, an execution subject of the processing at a time of reception of the responsibility change request in the parent aggregation unit is the aggregation unit 403 serving as the parent aggregation unit and is simply described as the aggregation unit 403 in the following description.

The aggregation unit 403 receives the responsibility change request from the child aggregation unit (step S1601). Next, the aggregation unit 403 references the time series DB 110, thereby acquiring loads on nodes responsible for aggregation of a request source aggregation unit (step S1602). In addition, the aggregation unit 403 determines whether or not a load on the child aggregation unit node that issues the request is the lowest among the nodes responsible for aggregation of the request source aggregation unit (step S1603). In a case where a load on the child aggregation unit node that issues the request is not the lowest (step S1603: No), the aggregation unit 403 generates the child aggregation unit in a node having the lowest load (step S1604). In addition, the aggregation unit 403 notifies the generated child aggregation unit of the same nodes responsible for aggregation as those of the request source (step S1605). Next, the aggregation unit 403 deletes the child aggregation unit serving as the request source (step S1606).

On the other hand, in a case where a load on the child aggregation unit node that issues the request is the lowest (step S1603: Yes), the aggregation unit 403 deletes all high-load flags of the request source aggregation unit (step S1607). In addition, the aggregation unit 403 notifies the child aggregation unit serving as the request source that a responsibility change is unavailable (step S1608).

After the processing operation in step S1606 or step S1608 finishes, the aggregation unit 403 terminates the processing at a time of reception of the responsibility change request in the parent aggregation unit.

Figure 17:
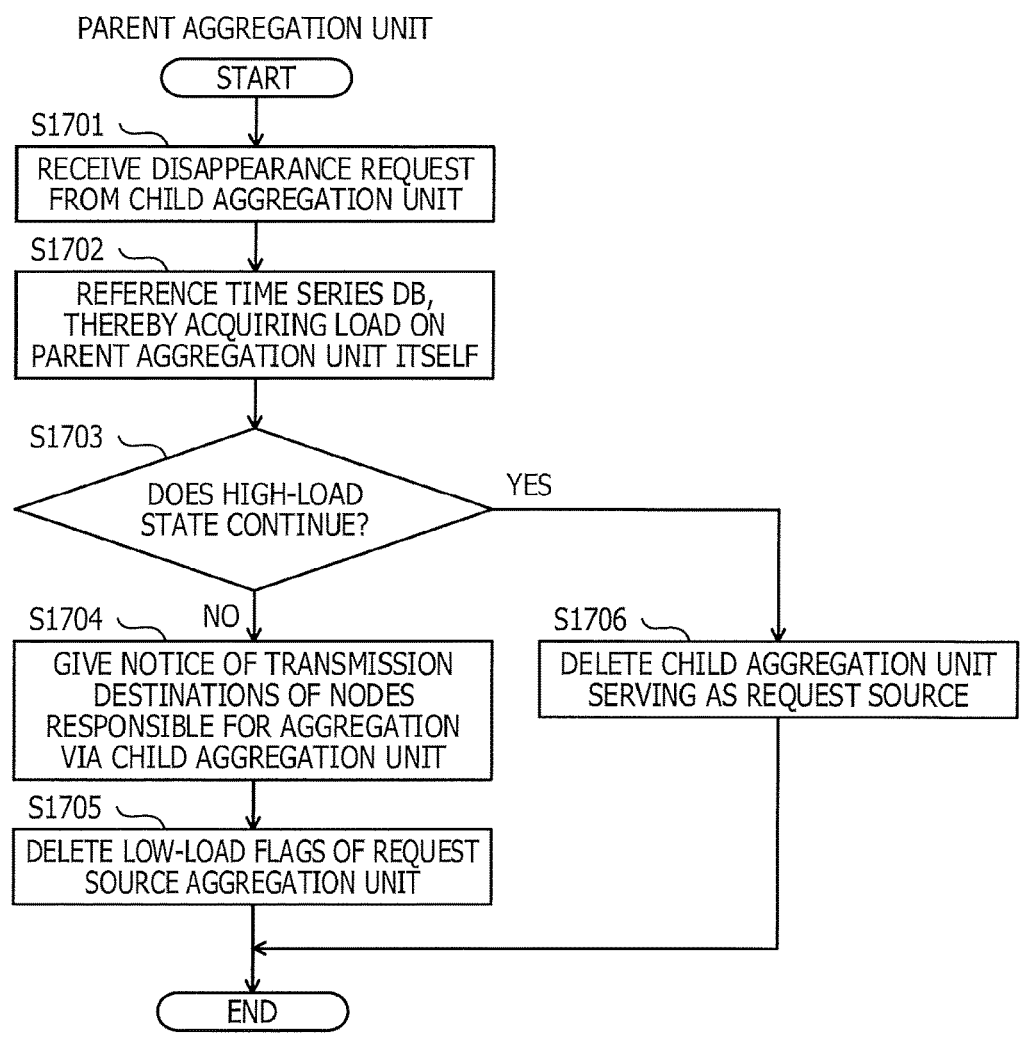
FIG. 17 is a flowchart illustrating an example of a procedure of processing at a time of reception of a disappearance request in the parent aggregation unit.

FIG. 17 is a flowchart illustrating an example of a procedure of processing at a time of reception of a disappearance request in the parent aggregation unit. The processing at a time of reception of the disappearance request in the parent aggregation unit is processing at a time when the aggregation unit 403 serving as the parent aggregation unit receives the disappearance request from the aggregation unit 403 serving as the child aggregation unit of the aggregation unit 403 itself serving as the parent aggregation unit. In this way, an execution subject of the processing at a time of reception of the disappearance request in the parent aggregation unit is the aggregation unit 403 serving as the parent aggregation unit and is simply described as the aggregation unit 403 in the following description.

The aggregation unit 403 receives the disappearance request from the child aggregation unit (step S1701). Next, the aggregation unit 403 references the time series DB 110, thereby acquiring a load on the parent aggregation unit itself (step S1702). In addition, the aggregation unit 403 determines whether or not a state in which a load on the aggregation unit 403 itself is high continues (step S1703). In a case where a state in which a load on the aggregation unit 403 itself is high does not continue (step S1703: No), the aggregation unit 403 gives notice of transmission destinations of nodes responsible for aggregation via the child aggregation unit (step S1704). In addition, the aggregation unit 403 deletes the child aggregation unit serving as the request source (step S1705). After the processing operation in step S1705 finishes, the aggregation unit 403 terminates the processing at a time of reception of the disappearance request in the parent aggregation unit.

On the other hand, in a case where a state in which a load on the aggregation unit 403 itself is high continues (step S1703: Yes), the aggregation unit 403 deletes all low-load flags of the request source aggregation unit (step S1706). In addition, without causing the child aggregation unit to disappear, the aggregation unit 403 terminates the processing at a time of reception of the disappearance request in the parent aggregation unit.

Figure 18:
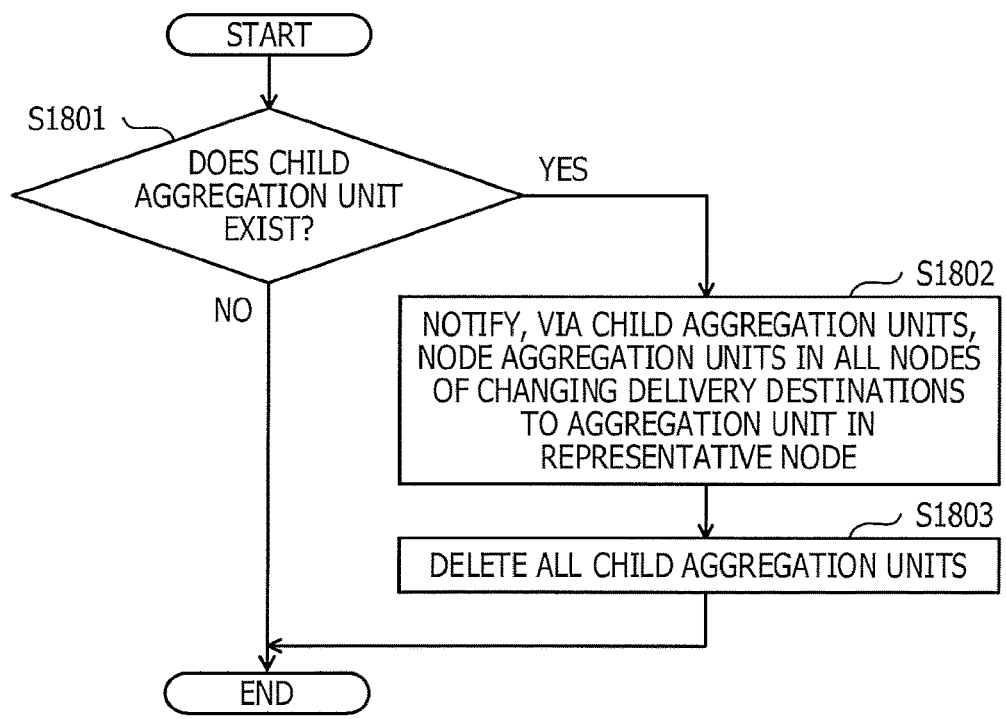
FIG. 18 is a flowchart illustrating an example of a procedure of processing performed at a time of increasing or decreasing nodes and performed by the representative node.

FIG. 18 is a flowchart illustrating an example of a procedure of processing performed at a time of increasing or decreasing nodes and performed by the representative node. The processing performed at a time of increasing or decreasing nodes and performed by the representative node is processing performed by the aggregation unit 403 in the representative node at a time of increasing or decreasing nodes for the information processing system 100. In this way, an execution subject of the processing performed at a time of increasing or decreasing nodes and performed by the representative node is the aggregation unit 403 in the representative node and is simply described as the aggregation unit 403 in the following description.

After decreasing or increasing nodes is implemented, the aggregation unit 403 determines whether or not the child aggregation unit exists (step S1801). In a case where the child aggregation unit exists (step S1801: Yes), the aggregation unit 403 notifies, via the child aggregation units, the node aggregation units 402 in all nodes of changing delivery destinations to the aggregation unit 403 in the representative node (step S1802). In addition, the aggregation unit 403 deletes all the child aggregation units (step S1803) and terminates the processing performed at a time of increasing or decreasing nodes and performed by the representative node.

On the other hand, in a case where no child aggregation unit exists (step S1801: No), the aggregation unit 403 terminates, with no specific change, the processing performed at a time of increasing or decreasing nodes and performed by the representative node.

As described above, each of nodes in the present embodiments determines load distribution of aggregation processing, based on a load on the self-node and transmitted loads on respective nodes. Therefore, since the determination is performed without using a DB, it is possible to suppress a load applied on the determination of load distribution. In addition, in the information processing system 100, a load is not concentrated on the representative node. Therefore, it is possible to avoid a bottleneck at a time of collecting aggregation values of the pieces of performance information 112. In addition, it is possible for the information processing system 100 to keep, at a minimum, an influence on business operations of the users U.

In addition, in a case where a responsibility change request is received, each of nodes in the present embodiments may generate the aggregation unit 403 in a node that is included in a node-responsible-for-aggregation group of the self-node and that has a low load. For this reason, each of nodes in the present embodiments decreases a load on a node, which becomes high, and causes a node having a low load to perform the aggregation processing. Therefore, it is possible to perform the load distribution.

In addition, in a case where a disappearance request is received, if a load on the self-node is low, each of nodes in the present embodiments may cause the aggregation unit 403 serving as a transmission source of the disappearance request to disappear, and the relevant node itself may execute the aggregation processing. For this reason, in a case where the load distribution does not have to be performed, each of nodes in the present embodiments may cause the aggregation unit 403 serving as the child aggregation unit of the relevant node itself to disappear, thereby being able to suppress excessive load distribution.

In addition, in a case where the aggregation unit 403 is generated by the aggregation unit 403 serving as the parent aggregation unit of another node, each of nodes in the present embodiments executes aggregation processing by using the aggregation unit 403 of the relevant node itself and transmits a processing result to the aggregation unit 403 serving as the parent aggregation unit. In addition, as described above, each of nodes in the present embodiments generates the aggregation unit 403 to serve as the child aggregation unit in another node, in some cases. Accordingly, each of nodes in the information processing system 100 is able to construct load distribution over three or more generations such as a parent, a child, and a grandchild.

In addition, in a case where nodes are increased or decreased, the aggregation unit 403 in the representative node may cause the aggregation units 403 located within the information processing system 100 and different from the aggregation unit 403 in the representative node to disappear. In a case where nodes are increased or decreased, loads on individual nodes are changed in some cases. Accordingly, by causing all the aggregation units 403 different from the aggregation unit 403 in the representative node to disappear and by performing load distribution again, the aggregation unit 403 in the representative node is able to perform adequate load distribution even in a case where nodes are increased or decreased.

Note that a preliminarily prepared program may be executed by a computer such as a personal computer or a workstation, thereby realizing a method for collecting the state information described in the present embodiments. The present state information collection program is recorded in a computer-readable recording medium such as a hard disk, a flexible disk, a Compact Disc-Read Only Memory (CD-ROM), or a Digital Versatile Disk (DVD) and is read from the recording medium by a computer, thereby being executed. In addition, the present state information collection program may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device included in a plurality of information processing devices of an information processing system, the information processing device comprising:
   a memory; and
   a processor coupled to the memory and the processor configured to:
      acquire pieces of load information indicating loads on the plurality of information processing devices from each of the plurality of information processing devices;
      perform a first aggregation processing that aggregates the acquired pieces of load information;
      determine whether the first aggregation processing is to be distributed or not based on the acquired pieces of load information;
      when the information processing device determines that the first aggregation processing is to be distributed, transmit, to at least two information processing devices included in plurality of information processing devices, an execution request of second aggregation processing, the second aggregation processing being aggregation processing for each of a plurality of device groups obtained by dividing the plurality of information processing devices by the number of the at least two information processing devices; and
      receive a result of the second aggregation processing from the at least two information processing devices.

2. The information processing device according to claim 1, wherein the processor is configured to:
   when a change request of execution subject of the second aggregation processing is received from a first information processing device included in the at least two information processing devices, select a second information processing device among from the plurality of information processing devices other than the and the at least two information processing devices, based on the acquired pieces of load information;
   transmit the execution request of second aggregation processing to the second information processing device; and
   cause the first information processing device to stop the second aggregation processing.

3. The information processing device according to claim 1, wherein the processor is configured to:
   when a stop request of the second aggregation processing is received from a third information processing device included in the at least two information processing devices, determine whether or not to stop the second aggregation processing executed by the third information based on the load of the indicated by the pieces of load information; and
   cause the third information to stop the second aggregation processing when the processor determines to stop the second aggregation processing executed by the third information.

4. The information processing device according to claim 1, wherein the processor is configured to:
   execute the first aggregation processing when an execution request for the first aggregation processing is received from a fourth information processing device included in the plurality of information processing devices; and
   transmit a result of the first aggregation processing to the fourth information processing device.

5. The information processing device according to claim 1, wherein the processor is configured to:
cause the at least two information processing devices to stop the second aggregation processing when a number of the plurality of information processing devices is changed.

6. An information processing system, comprising:
a first information processing device including a first memory and a first processor;
a second information processing device including a second memory and a second processor; and
a third information processing device including a third memory and a third processor;
wherein the first processor is configured to:
acquire pieces of load information indicating loads on a plurality of information processing devices including at least the first information processing device, the second information processing device and the third information processing device from each of the plurality of information processing devices;
perform a first aggregation processing that aggregates the acquired pieces of load information;
determine whether the first aggregation processing is to be distributed or not based on the acquired pieces of load information;
when determining that the first aggregation processing is to be distributed, transmit, to at least two information processing devices which are included in the plurality of information processing devices, include the second information processing device and the third information processing device and do not include the first information processing device, an execution request of a second aggregation processing to aggregate pieces of load information for grouped information processing devices included in each of groups which are obtained by dividing the plurality of information processing devices by a number of the at least two information processing devices;
transmit, to the grouped information processing devices of each of the groups, a change instruction to change a transmission destination of the load information from the first information processing device to a corresponding one of the at least two information processing devices; and
transmit, to the at least two information processing devices, a transmission instruction to transmit the result of the second aggregation processing to the first information processing device,
wherein the second processor is configured to:
perform the second aggregation processing for a corresponding one of the groups; and
transmit the result of the second aggregation processing to the first information processing device,
wherein the third processor is configured to:
perform the second aggregation processing for a corresponding one of the groups; and
transmit the result of the second aggregation processing to the first information processing device.

7. A non-transitory computer-readable storage medium for causing an information processing device, included in a plurality of information processing devices of an information processing system, to execute a process, the process comprising:
acquiring pieces of load information indicating loads on the plurality of information processing devices from each of the plurality of information processing devices;
performing a first aggregation processing that aggregates the acquired pieces of load information;
determining whether the first aggregation processing is to be distributed or not based on the acquired pieces of load information,
when the information processing device determines that the first aggregation processing is to be distributed, transmitting, to at least two information processing devices included in plurality of information processing devices, an execution request of second aggregation processing, the second aggregation processing being aggregation processing for each of a plurality of device groups obtained by dividing the plurality of information processing devices by the number of the at least two information processing devices; and
receiving a result of the second aggregation processing from the at least two information processing devices.

* * * * *